US 6,567,504 B1

(12) United States Patent
Kercheval et al.

(10) Patent No.: US 6,567,504 B1
(45) Date of Patent: *May 20, 2003

(54) AUTOMATED CALLING SYSTEM WITH DATABASE UPDATING

(75) Inventors: Kent E. Kercheval, Sheridan, IN (US); Al Langsenkamp, Indianapolis, IN (US)

(73) Assignee: Sigma Communications, Inc., Indianapolis, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/425,865

(22) Filed: Oct. 23, 1999

Related U.S. Application Data

(63) Continuation-in-part of application No. 09/286,647, filed on Feb. 3, 1999, which is a continuation-in-part of application No. 09/115,304, filed on Jul. 14, 1998, now Pat. No. 6,009,149, which is a continuation-in-part of application No. 08/717,495, filed on Sep. 20, 1996, now Pat. No. 5,912,947, which is a continuation-in-part of application No. 08/262,923, filed on Jun. 20, 1994, now Pat. No. 5,559,867.

(51) Int. Cl.[7] ............................................. G11B 31/00
(52) U.S. Cl. ....................................... 379/69; 379/266.1
(58) Field of Search ........................... 379/67.1, 69, 76, 379/77, 85, 88.22, 88.23, 88.24, 201.01, 265.01, 266.07, 266.1, 37, 40, 41, 51, 90.01, 88.11, 88.18, 355.06

(56) References Cited

U.S. PATENT DOCUMENTS

| | | | |
|---|---|---|---|
| 4,054,756 A | 10/1977 | Comella et al. | 179/18 B |
| 4,071,698 A | 1/1978 | Barger, Jr. et al. | 179/2 R |
| 4,160,125 A | 7/1979 | Bower et al. | 179/6 D |
| 4,320,256 A | 3/1982 | Freeman | 379/92 |
| 4,406,925 A | 9/1983 | Jordan et al. | 379/69 |

(List continued on next page.)

FOREIGN PATENT DOCUMENTS

| | | | | |
|---|---|---|---|---|
| DE | 2717137 | 11/1978 | | 379/37 |
| FR | 2661301 | 10/1992 | | 379/92 |
| JP | 0101383 | 1/1989 | | |
| JP | 0241997 | 9/1989 | | 379/92 |
| JP | 0413184 | 7/1992 | | |
| JP | 0532785 | 2/1993 | | 379/85 |
| WO | 9208309 | 5/1992 | | 379/92 |

OTHER PUBLICATIONS

"Method for Performing Phone Call to Unknown Callees", IBM Technical Disclosure Bulletin, vol. 36, No. 10, Oct. 1993.
"Stok Offers Applications Generates Voice Response Systems", Audiotex Update, Sep. 1989, vol. 1, No. 9.
"Stok Software: Builds System on Dialogic Board", Voice Technology News, Jan. 2, 1990, vol. 2, No. 1.
"Intelligent Automated Outdialing Offered", Audiotex Update, Aug. 1990, vol. 2, No. 8.

*Primary Examiner*—Scott L. Weaver
(74) *Attorney, Agent, or Firm*—Russell E. Fowler, II; Doreen J. Gridley; Ice Miller

(57) ABSTRACT

An automated calling system includes a database comprising phone numbers and one or more data fields associated with each phone number. Phone numbers (callees) in the database are selected based on the data fields associated therewith. A recorded voice message is transmitted to callees through a plurality of outgoing phone lines, and callees are prompted to enter one of several vocal or TOUCH TONE responses, which is recorded. The database record for the callee is automatically updated based on the vocal or TOUCH TONE response, so that the updated field may be used to select whether to send a future call to the callee.

20 Claims, 56 Drawing Sheets

U.S. PATENT DOCUMENTS

| | | | |
|---|---|---|---|
| 4,438,296 A | 3/1984 | Smith | 379/69 |
| 4,446,336 A | 5/1984 | Bethel et al. | 179/6.1 |
| 4,554,418 A | 11/1985 | Toy | 179/2 DP |
| 4,599,493 A | 7/1986 | Cave | 379/92 |
| 4,761,807 A | 8/1988 | Mathews et al. | 379/89 |
| 4,792,968 A | 12/1988 | Katz | 379/92 |
| 4,797,911 A | 1/1989 | Szlam et al. | 379/67 |
| 4,894,857 A | 1/1990 | Szlam et al. | 379/67 |
| 4,922,520 A | 5/1990 | Bermard et al. | 379/88 |
| 4,930,150 A | 5/1990 | Katz | 379/92 |
| 4,942,616 A | 7/1990 | Linstroth et al. | 381/51 |
| 4,996,705 A | 2/1991 | Entenmann et al. | 379/91 |
| 4,998,272 A | 3/1991 | Hawkins, Jr. et al. | 379/69 |
| 5,040,208 A | 8/1991 | Jolissaint | 379/209 |
| 5,056,086 A | 10/1991 | Libonti | 370/62 |
| 5,058,152 A | 10/1991 | Solomon et al. | 379/67 |
| 5,179,589 A | 1/1993 | Syu | 379/265 |
| 5,185,787 A | 2/1993 | Katz | 379/92 |
| 5,218,631 A | 6/1993 | Katz | 379/88 |
| RE34,587 E | 4/1994 | Crane et al. | 379/92 |
| 5,311,507 A | 5/1994 | Bedrossian | 379/92 |
| 5,341,412 A | 8/1994 | Ramot et al. | 379/92 |

```
Select Lists To Be Called                              11:53:12 am Fri
Entry List # Description                 Priority Message
  1
  2
  3
  4
  5
  6
  7
  8
  9
 10

Display Starting at List Number
      1    5700                              1       301COMMUNITY TEST MESSAGE
      2    S&LP                              1       302ABC COMPANY, RESPONSE MESSAGE
      3    SITE SUPERVISOR                   1       302ABC COMPANY, RESPONSE MESSAGE
      4    KEY STAFF MEMBERS                 1       302ABC COMPANY, RESPONSE MESSAGE
>>    5    INCIDENT COMMAND                  1       302ABC COMPANY, RESPONSE MESSAGE
      6    STAFF MEMBERS(ALL)                1       302ABC COMPANY, RESPONSE MESSAGE
```

F1-Select List, F2-Change Messages, F3-Delete Entry F6-Toggle Search,
F7-Change Priority, F9-Zones, PgUp/Dn To Scroll, Esc-Exit

FIG. 4

```
Select Lists To Be Called                                    11:53:29 am Fri
Entry List # Description                Priority Message
  1
  2
  3
  4
  5
  6
  7
  8
  9
 10

Display Starting at Description
         5    INCIDENT COMMAND              1       302ABC COMPANY, RESPONSE MESSAGE
         4    KEY STAFF MEMBERS             1       302ABC COMPANY, RESPONSE MESSAGE
         2    S&LP                          1       302ABC COMPANY, RESPONSE MESSAGE
         7    S&LP EMERG COVERAGE           1       303S&LP COVERAGE
        >> 3  SITE SUPERVISOR               1       302ABC COMPANY, RESPONSE MESSAGE
         6    STAFF MEMBERS(ALL)            1       302ABC COMPANY, RESPONSE MESSAGE F1-Select List, F2-Change Messages, F3-Delete Entry F6-Toggle Search,
F7-Change Priority, F9-Zones, PgUp/Dn To Scroll, Esc-Exit
```

FIG. 5

```
Select Lists To Be Called                    11:54:54 am Fri
Entry List #  Description              Priority Message
   1
   2
   3
   4

┌─────────────────── Select Message to Use ───────────────────┐
   │  Msg #—Description——————————Length—Valid—Date———Time—Response│
   │   301 COMMUNITY TEST MESSAGE  57.84  YES  08/31/93 20:27 YES │
   │>> 302 ABC COMPANY, RESPONSE MESSAGE 52.26 YES 08/31/93 20:39 YES│
   │   303 S&LP COVERAGE           53.64  YES  08/31/93 21:25 YES │
   │   304 DRILL ANNOUNCEMENT      57.31  YES  08/31/93 21:15 YES │
   │   305 ZONE ALERT              57.37  YES  08/31/93 21:00 YES │
   │   306 UNAFFECTED ZONES        57.42  YES  08/31/93 21:07 YES │
   │   307 ALL CLEAR               57.21  YES  08/31/93 20:48 NO  │
   │   308 *                        0.00  NO                   NO │
   │   309 *                        0.00  NO                   NO │
   │   310 *                        0.00  NO                   NO │
   └─────────────────────────────────────────────────────────────┘

F1-Select, F2-Change Description, F3-Change Text, F4-Record Message
F5-Toggle Required Response, F6-Play Message, F7-Clear Line, F8-Copy
Line, Esc-Exit, PgUp, PgDn
```

FIG. 6

Select Lists To Be Called          Priority Message

Entry List # Description
1
2
3
4

```
                  Select Message to Use
—Msg #—Description————————Length—Valid—Date————Time——Response
  301 COMMUNITY TEST MESSAGE   57.84  YES   08/31/93  20:27   YES
  302 ABC COMPANY, RESPONSE MESSAGE 52.26 YES 08/31/93 20:39 YES
  303 S&LP COVERAGE            53.64  YES   08/31/93  21:25   YES
  304 DRILL ANNOUNCEMENT       57.31  YES   08/31/93  21:15   YES
  305 ZONE ALERT               57.37  YES   08/31/93  21:00   YES
  306 UNAFFECTED ZONES         57.42  YES   08/31/93  21:07   YES
  307 ALL CLEAR                57.21  YES   08/31/93  20:48   NO
>>308 EXAMPLE MESSAGE           0.00  NO                      NO
  309 *                         0.00  NO
  310 *                         0.00  NO
```

12:19:08 pm Fri

F1-Select, F2-Change Description, F3-Change Text, F4-Record Message
F5-Toggle Required Response, F6-Play Message, F7-Clear Line, F8-Copy
Line, Esc-Exit, PgUp, PgDn

FIG. 7

```
─── RECORD #    308: EXAMPLE MESSAGE ───         12:24:19 pm Fri

THIS IS A SAMPLE SCRIPT TO ILLUSTRATE YOUR ABILITY TO COMPOSE A MESSAGE
BEFORE YOU RECORD IT.  IT'S MUCH EASIER TO READ FROM THE SCREEN RATHER
THAN TO RECITE FROM MEMORY.

YOU HAVE UP TO FIFTEEN LINES FOR EACH MESSAGE IF YOU NEED THEM.

F2-Save Changes, F3-Insert, F4-Delete, ESC-Quit Without Saving Changes
```

FIG. 8

```
                                                    12:24:57 pm Fri
         RECORD #   308: EXAMPLE MESSAGE
THIS IS A SAMPLE SCRIPT TO ILLUSTRATE YOUR ABILITY TO COMPOSE A MESSAGE
BEFORE YOU RECORD IT.  IT'S MUCH EASIER TO READ FROM THE SCREEN RATHER
       ORY.
┌──────────────────┐
│ RECORD UPDATED   │
│ Press Return     │
└──────────────────┘
  ███████████

YOU HAVE UP TO FIFTEEN LINES FOR EACH MESSAGE IF YOU NEED THEM.

F2-Save Changes, F3-Insert, F4-Delete, ESC-Quit Without Saving Changes
```

FIG. 9

```
                                              12:26:01 pm Fri
    ─────────MESSAGE RECORDING
Recording Message # 308 EXAMPLE MESSAGE
Press Enter to Transfer Control to Keyboard
Answer phone when it rings and say 'Hello'
PHONE SET IN CONTROL-RECORDING!!!

─────────Message Text─────────
THIS IS A SAMPLE SCRIPT TO ILLUSTRATE YOUR ABILITY TO COMPOSE A MESSAGE
BEFORE YOU RECORD IT.  IT'S MUCH EASIER TO READ FROM THE SCREEN RATHER
THAN TO RECITE FROM MEMORY.

YOU HAVE UP TO FIFTEEN LINES FOR EACH MESSAGE IF YOU NEED THEM.
```

FIG. 10

```
                                                    12:28:12 pm Fri
─────────────── MESSAGE RECORDING ───────────────
Recording Message # 308 EXAMPLE MESSAGE RECORDING COMPLETED!!
Message Length = 13.15 Seconds

PRESS ENTER TO CONTINUE
```

FIG. 11

```
Select Lists To Be Called                            12:31:59 pm Fri
Entry List # Description              Priority Message
   1
   2
   3
   4
  ┌─────────────────────── Select Message to Use ──────────────────────┐
  │ -Msg #-Description---------------Length-Valid-Date----Time--Response│
  │  301 COMMUNITY TEST MESSAGE       57.84    YES    08/31/93 20:27 YES│
  │  302 ABC COMPANY, RESPONSE MESSAGE 52.26   YES    08/31/93 20:39 YES│
  │  303 S&LP COVERAGE                53.64    YES    08/31/93 21:25 YES│
  │  304 DRILL ANNOUNCEMENT           57.31    YES    08/31/93 21:15 YES│
  │  305 ZONE ALERT                   57.37    YES    08/31/93 21:00 YES│
  │  306 UNAFFECTED ZONES             57.42    YES    08/31/93 21:07 YES│
  │  307 ALL CLEAR                    57.21    YES    08/31/93 20:48 NO │
  │>>308 EXAMPLE MESSAGE              14.32    YES    09/10/93 12:30 YES│
  │  309 *                             0.00    NO                    NO │
  │  310 *                             0.00    NO                    NO │
  └────────────────────────────────────────────────────────────────────┘

F1-Select, F2-Change Description, F3-Change Text, F4-Record Message
F5-Toggle Required Response, F6-Play Message, F7-Clear Line, F8-Copy
Line, Esc-Exit, PgUp, PgDn
```

FIG. 12

```
                                                          12:32:22 pm Fri
               ─────── Play Message ───────
Now Playing Message#:308    EXAMPLE MESSAGE ─────── Message Text ───────
THIS IS A SAMPLE SCRIPT TO ILLUSTRATE YOUR ABILITY TO COMPOSE A MESSAGE
BEFORE YOU RECORD IT.  IT'S MUCH EASIER TO READ FROM THE SCREEN RATHER
THAN TO RECITE FROM MEMORY.

YOU HAVE UP TO FIFTEEN LINES FOR EACH MESSAGE IF YOU NEED THEM.
```

FIG. 13

```
┌─────────────────────────────────────────────────────────────────┐
│ ─────Play Message─────                    12:33:04 pm Fri      │
│ Now Playing Message#:308  EXAMPLE MESSAGE                       │
│ Place Phone on Hook And Press Enter                             │
│ ─────────────────────────────────────────Message Text────────── │
│ THIS IS A SAMPLE SCRIPT TO ILLUSTRATE YOUR ABILITY TO COMPOSE A MESSAGE │
│ BEFORE YOU RECORD IT.  IT'S MUCH EASIER TO READ FROM THE SCREEN RATHER │
│ THAN TO RECITE FROM MEMORY.                                     │
│                                                                 │
│ YOU HAVE UP TO FIFTEEN LINES FO  EACH MESSAGE IF YOU NEED THEM. │
└─────────────────────────────────────────────────────────────────┘

FIG. 14

```
Select Lists To Be Called                            12:34:04 pm Fri
Entry List # Description              Priority  Message
    1
    2
    3
    4
    ┌─────────────────Select Message to Use──────────────────────┐
    │-Msg #-Description─────────────────Length-Valid-Date────Time──Response│
    │ 301 COMMUNITY TEST MESSAGE          57.84    YES  08/31/93 20:27 YES │
    │ 302 ABC COMPANY, RESPONSE MESSAGE   52.26    YES  08/31/93 20:39 YES │
    │ 303 S&LP COV                                               :25  YES │
    │ 304 DRILL AN      ┌─────COPY A MENU LINE─────┐             15   YES │
    │ 305 ZONE ALE      │                          │             00   YES │
    │ 306 UNAFFECT      │   Copy to Line #: 319    │             07   YES │
    │ 307 ALL CLEA      │                          │             48   NO  │
    │>> 308 EXAMPLE     │                          │             30   YES │
    │ 309 *             │ ENTER-Continue, ESC-Exit │                  NO  │
    │ 310 *             └──────────────────────────┘                  NO  │
    │                                                                    │
    └────────────────────────────────────────────────────────────────────┘

F1-Select, F2-Change Description, F3-Change Text, F4-Record Message
F5-Toggle Required Response, F6-Play Message, F7-Clear Line, F8-Copy
Line, Esc-Exit, PgUp, PgDn
```

FIG. 15

```
                                            12:34:47 pm Fri

Select Lists To Be Called
Entry List # Description              Priority Message
    1
    2
    3
    4

┌─────────────────── Select Message to Use ───────────────────┐
   │ —Msg #—Description————————Length—Valid—Date——Time—Response  │
   │    311  *                   0.00   NO              NO       │
   │    312  *                   0.00   NO              NO       │
   │    313  *                   0.00   NO              NO       │
   │    314  *                   0.00   NO              NO       │
   │    315  *                   0.00   NO              NO       │
   │    316  *                   0.00   NO              NO       │
   │    317  *                   0.00   NO              NO       │
   │    318  *                   0.00   NO              NO       │
   │ >> 319  EXAMPLE MESSAGE     0.00   NO              NO       │
   │    320  *                   0.00   NO              NO       │
   │                                                             │
   │ F1-Select, F2-Change Description, F3-Change Text, F4-Record Message
   │ F5-Toggle Required Response, F6-Play Message, F7-Clear Line, F8-Copy
   │ Line, Esc-Exit, PgUp, PgDn                                  │
   └─────────────────────────────────────────────────────────────┘

FIG. 16
```

```
Select Lists To Be Called                                    12:37:29 pm Fri
Entry List # Description              Priority  Message
   1      3   SITE SUPERVISOR             1      308EXAMPLE MESSAGE
   2
   3
   4
   5
   6
   7
   8
   9
  10

Display Starting at List Number
         1    5700                        1     301COMMUNITY TEST MESSAGE
         2    S&LP                        1     302ABC COMPANY, RESPONSE MESSAGE
     >>  3    SITE SUPERVISOR             1     302ABC COMPANY, RESPONSE MESSAGE
         4    KEY STAFF MEMBERS           1     302ABC COMPANY, RESPONSE MESSAGE
         5    INCIDENT COMMAND            1     302ABC COMPANY, RESPONSE MESSAGE
         6    STAFF MEMBERS(ALL)          1     302ABC COMPANY, RESPONSE MESSAGE F1-Select List, F2-Change Messages, F3-Delete Entry F6-Toggle Search,
F7-Change Priority, F9-Zones, PgUp/Dn To Scroll, Esc-Exit
```

FIG. 17

```
                                                     12:42:11 pm Fri
Select Lists To Be Called
Entry List # Description            Priority Message
   1       3   SITE SUPERVISOR           1    308EXAMPLE MESSAGE
   2       4   KEY STAFF MEMBERS         1    302ABC COMPANY, RESPONSE MESSAGE
   3       8   FIRE BRIGADE              1    302ABC COMPANY, RESPONSE MESSAGE
   4      13   DAILY TEST CALL           2    301COMMUNITY TEST MESSAGE
   5
   6
   7
   8
   9
  10

Display Starting  ┌─ CHANGE MESSAGE ──┐
           7   S&LP│Entry To Change: 1 │         3S&LP COVERAGE
           8   FIRE│F1-Change, Esc-Exit│         2ABC COMPANY, RESPONSE MESSAGE
           9   CARR└───────────────────┘         4DRILL ANNOUNCEMENT
          10   SWIT                              4DRILL ANNOUNCEMENT
          11   DAYTO                             4DRILL ANNOUNCEMENT
  >>      13   DAILY TEST CALL           2       301COMMUNITY TEST MESSAGE F1-Select List, F2-Change Messages, F3-Delete Entry F6-Toggle Search,
F7-Change Priority, F9-Zones, PgUp/Dn To Scroll, Esc-Exit

FIG. 18
```

```
Select Lists To Be Called                                    12:45:06 pm Fri
Entry List #  Description           Priority  Message
  1       3   SITE SUPERVISOR           1     308EXAMPLE MESSAGE
  2       4   KEY STAFF MEMBERS         1     302ABC COMPANY, RESPONSE MESSAGE
  3       8   FIRE BRIGADE              1     302ABC COMPANY, RESPONSE MESSAGE
  4      13   DAILY TEST CALL           2     301COMMUNITY TEST MESSAGE Maintain Messages
   -Msg #--Description-----------------Length--Valid--Date--------Time---Response
    301 COMMUNITY TEST MESSAGE          57.84  YES   08/31/93    20:27   YES
    302 ABC COMPANY, RESPONSE MESSAGE   52.26  YES   08/31/93    20:39   YES
    303 S&LP COVERAGE                   53.64  YES   08/31/93    21:25   YES
    304 DRILL ANNOUNCEMENT              57.31  YES   08/31/93    21:15   YES
    305 ZONE ALERT                      57.37  YES   08/31/93    21:00   YES
    306 UNAFFECTED ZONES                57.42  YES   08/31/93    21:07   YES
    307 ALL CLEAR                       57.21  YES   08/31/93    20:48   NO
 >> 308 EXAMPLE MESSAGE                 13.46  YES   09/10/93    12:44   YES
    309 *                                0.00  NO                        NO
    310 *                                0.00  NO                        NO F1-Select, F2-Change Description, F3-Change Text, F4-Record Message
F5-Toggle Required Response, F6-Play Message, F7-Clear Line, F8-Copy
Line, Esc-Exit, PgUp, PgDn
```

FIG. 19

```
Select Lists To Be Called                          12:45:42 pm Fri
Entry List # Description              Priority Message
  1      3    SITE SUPERVISOR             1     308EXAMPLE MESSAGE
  2      4    KEY STAFF MEMBERS           1     302ABC COMPANY, RESPONSE MESSAGE
  3      8    FIRE BRIGADE                1     302ABC COMPANY, RESPONSE MESSAGE
  4     13    DAILY TEST CALL             2     301COMMUNITY TEST MESSAGE
  5
  6
  7
  8
  9
 10
              ┌──────── DELETE LIST ENTRY ────────┐
Display Starting    S&LP │Entry To Delete: 1       │  3S&LP COVERAGE
         7          FIRE │F1-Change, Esc-Exit      │  2ABC COMPANY, RESPONSE MESSAGE
         8          CARR └─────────────────────────┘  4DRILL ANNOUNCEMENT
         9          SWIT                              4DRILL ANNOUNCEMENT
        10          DAYTO                             4DRILL ANNOUNCEMENT
        11
 >>     13          DAILY TEST CALL         2         301COMMUNITY TEST MESSAGE F1-Select List, F2-Change Messages, F3-Delete Entry F6-Toggle Search,
F7-Change Priority, F9-Zones, PgUp/Dn To Scroll, Esc-Exit

FIG. 20
```

```
Select Lists To Be Called                                      12:46:05 pm Fri
Entry List # Description          Priority Message
  1       4    KEY STAFF MEMBERS      1    302ABC COMPANY, RESPONSE MESSAGE
  2       8    FIRE BRIGADE           1    302ABC COMPANY, RESPONSE MESSAGE
  3      13    DAILY TEST CALL        2    301COMMUNITY TEST MESSAGE
  4
  5
  6
  7
  8
  9
 10

Display Starting at List Number
          7    S&LP EMERG COVERAGE    1    303S&LP COVERAGE
          8    FIRE BRIGADE           1    302ABC COMPANY, RESPONSE MESSAGE
          9    CARROLL CO DISPATCH    1    304DRILL ANNOUNCEMENT
         10    SWITZERLAND DISPATCH   1    304DRILL ANNOUNCEMENT
         11    DAYTON WALTHER         1    304DRILL ANNOUNCEMENT
 >>      13    DAILY TEST CALL        2    301COMMUNITY TEST MESSAGE F1-Select List, F2-Change Messages, F3-Delete Entry F6-Toggle Search,
F7-Change Priority, F9-Zones, PgUp/Dn To Scroll, Esc-Exit
```

FIG. 21

```
                                                      12:49:37 pm Fri
Select Lists To Be Called
Entry List # Description           Priority Message
   1      4   KEY STAFF MEMBERS        1    302ABC COMPANY, RESPONSE MESSAGE
   2      8   FIRE BRIGADE             1    302ABC COMPANY, RESPONSE MESSAGE
   3     13   DAILY TEST CALL          2    301COMMUNITY TEST MESSAGE
   4
   5
   6
   7
   8
   9
  10

Display Starting  ┌─── CHANGE LIST ENTRY ────┐
         7    S&LP│ Entry To Change:  2      │   3S&LP COVERAGE
         8    FIRE│ F1-Change, Esc-Exit      │   2ABC COMPANY, RESPONSE MESSAGE
         9    CARR└──────────────────────────┘   4DRILL ANNOUNCEMENT
        10    SWIT                               4DRILL ANNOUNCEMENT
        11    DAYTO                              4DRILL ANNOUNCEMENT
     >> 13    DAILY TEST CALL        2           301COMMUNITY TEST MESSAGE F1-Select List, F2-Change Messages, F3-Delete Entry F6-Toggle Search,
F7-Change Priority, F9-Zones, PgUp/Dn To Scroll, Esc-Exit

FIG. 22
```

```
Select Lists To Be Called                            12:51:50 pm Fri
Entry List # Description           Priority  Message
  1      4    KEY STAFF MEMBERS       1      302ABC COMPANY, RESPONSE MESSAGE
  2      8    FIRE BRIGADE            1      302ABC COMPANY, RESPONSE MESSAGE
  3     13    DAILY TEST CALL         2      301COMMUNITY TEST MESSAGE
  4
  5
  6
  7
  8
  9
 10
────────────────────────── Change Entry: 2 ──────────────────────────
List Number:       8
List Description:  FIRE BRIGADE
List Priority:     2
List Message #:       302 ABC COMPANY, RESPONSE MESSAGE
F1-Update Entry, F2-Message Maintenance, Esc-Exit F7-Change Priority, F9-Zones, PgUp/Dn To Scroll, Esc-Exit
```

FIG. 23

Select Lists To Be Called                                    12:52:04 pm Fri

| Entry List # | Description | Priority | Message |
|---|---|---|---|
| 1 | 4 KEY STAFF MEMBERS | 1 | 302ABC COMPANY, RESPONSE MESSAGE |
| 2 | 8 FIRE BRIGADE | 2 | 302ABC COMPANY, RESPONSE MESSAGE |
| 3 | 13 DAILY TEST CALL | 2 | 301COMMUNITY TEST MESSAGE |
| 4 | | | |
| 5 | | | |
| 6 | | | |
| 7 | | | |
| 8 | | | |
| 9 | | | |
| 10 | | | |

Display Starting at List Number 8

| | | | |
|---|---|---|---|
| 7 | S&LP EMERG COVERAGE | 1 | 303S&LP COVERAGE |
| 8 | FIRE BRIGADE | 1 | 302ABC COMPANY, RESPONSE MESSAGE |
| 9 | CARROLL CO DISPATCH | 1 | 304DRILL ANNOUNCEMENT |
| 10 | SWITZERLAND DISPATCH | 1 | 304DRILL ANNOUNCEMENT |
| 11 | DAYTON WALTHER | 1 | 304DRILL ANNOUNCEMENT |
| 13 | DAILY TEST CALL | 2 | 301COMMUNITY TEST MESSAGE |
| >> | | | |

F1-Select List, F2-Change Messages, F3-Delete Entry F6-Toggle Search,
F7-Change Priority, F9-Zones, PgUp/Dn To Scroll, Esc-Exit

FIG. 24

```
Select Geo Zones To Be Called                         12:56:04 pm Fri
Entry Zone Description                  Priority Message
  1    1 NORTH-WEST OFPLANT                      301COMMUNITY TEST MESSAGE
  2
  3
  4
  5
  6
  7
  8
  9
 10
================================================================
Display Starting at Geo Zone Number
  >>  1 NORTH-WEST OFPLANT                       301COMMUNITY TEST MESSAGE
      2 NORTH-EAST OF PLANT                      301COMMUNITY TEST MESSAGE
      3 SOUTH-WEST OF PLANT                      301COMMUNITY TEST MESSAGE
      4 SOUTH-EAST OF PLANT                      301COMMUNITY TEST MESSAGE
      5 ALL AREAS AROUND PLANT                   301COMMUNITY TEST MESSAGE
      6 TEST ZONE                                301COMMUNITY TEST MESSAGE
================================================================
```

F1-Select Geo Zones, F2-Change Messages, F3-Delete Entry, F6-Toggle Search, F7-Change Zone, F8-Lists, F9-Accept, PgUp/Dn To Scroll, Esc-Exit

FIG. 25

```
                                                      1:00:29 pm Fri

Select Geo Zones To Be Called
Entry Zone Description              Priority Message
  1    1 NORTH-WEST OFFPLANT                 301COMMUNITY TEST MESSAGE
  2
  3
  4
  5
  6
  7
  8
  9
 10

Display Starting    ┌──── CHANGE ZONE ENTRY ────┐
 >>    1 NORTH-     │ Entry To Change: 1        │   1COMMUNITY TEST MESSAGE
       2 NORTH-     │ F1-Change, Esc-Exit       │   1COMMUNITY TEST MESSAGE
       3 SOUTH-     └───────────────────────────┘   1COMMUNITY TEST MESSAGE
       4 SOUTH-                                     1COMMUNITY TEST MESSAGE
       5 ALL ARE                                    1COMMUNITY TEST MESSAGE
       6 TEST ZONE                                301COMMUNITY TEST MESSAGE F1-Select Geo Zones, F2-Change Messages, F3-Delete Entry, F6-Toggle
Search, F7-Change Zone, F8-Lists, F9-Accept, PgUp/Dn To Scroll, Esc-Exit
```

FIG. 26

Select Geo Zones To Be Called                                          1:01:14 pm Fri Change Entry: 1

| | | | Coordinates | |
|---|---|---|---|---|
| Geo Zone: | 1 | | Upper Left | Lower Right |
| Descrp.: | NORTH-WEST OFFPLANT | | .00 | 5.00 |
| Message: | 301 COMMUNITY TEST MESSA Red: | | .00 | 5.00 |
| Unlisted: | N | Green: | | |

Call Criteria

1 I BUSINESSES
2 I RESIDENTIAL
3   TEST ZONE MEMBERS
4
5
6
7
8
9
10
11
12
13
14
15
16
17
18
19
20
21
22
23
24
25
26
27
28
29
30
31
32
33
34
35
36
37
38
39

F1-Update Entry, F2-Message Maintenance, Esc-Exit

FIG. 27

```
Messages Used By This Calling                          1:12:33 pm Fri
Msg#:  301 COMMUNITY TEST MESSAGE
Msg#:  302 ABC COMPANY, RESPONSE MESSAGE
```

F1-To Play Messages, F2-Record Messages, F9-Continue, Esc-Exit

FIG. 28

```
Call Generation Results              1:13:05 pm Fri
                            Message                        Calls
LIST:  4 KEY STAFF MEMBERS  302ABC COMPANY, RESPONSE MES       7
LIST:  8 FIRE BRIGADE       302ABC COMPANY, RESPONSE MES      37
LIST: 13 DAILY TEST CALL    301COMMUNITY TEST MESSAGE         24
ZONE:  1 NORTH-WEST OFFPLANT 301COMMUNITY TEST MESSAGE        16

CALLS TO BE MADE:    84        Press F9 To Continue, Esc-Exit
```

FIG. 29

```
Telecas   ABC COMPANY CARROLLTON KY   Serial #: 000123   1:13:47 pm Fri
                          ─── ACTIVE ───
┌─────────────────────────────────────────┐
│ Start Call                              │
│ Calling Level:2    (1=Low, 2= Med, 3=High) │
│ Retries:    3  (0-99)                   │
│ F1-Process, Esc-Exit                    │
└─────────────────────────────────────────┘
```

FIG. 30

```
Telecas   ABC COMPANY CARROLLTON KY   Serial #: 000123   1:15:14 pm Fri
                          ─── ACTIVE ───
┌─────────────────────────────────────────┐
│ Start Call                              │
│ Calling Level:2    (1=Low, 2= Med, 3=High) │
│ Retries:    3  (0-99)      ─── PASSWORD REQUIRED ───
│ F1-Process, Esc-   ┌──────────────────────────────┐
│                    │ Enter Password:              │
│                    │ RETURN-Continue, Esc-Exit    │
└────────────────────└──────────────────────────────┘
```

FIG. 31

Telecas    ABC COMPANY CARROLLTON KY    Serial #: 000123    1:15:48 pm Fri

———————————————— ACTIVE ————————————————
```
Start Call
Calling Level:2      (1=Low, 2= Med, 3=High)
Retries:       3   (0-99)
Press Enter To Continue
Calls Queued =    84     Calling Session Number =    17
```

FIG. 32

Telecas   ABC COMPANY CARROLLTON KY   Serial #: 000123   1:18:13 pm Fri
Geo/List Calling  Bulletin Board  Scheduled Calling  System Maint.  Exit

```
Make Calls
Stop Calls
Calling Log
Geo Message Maintenance
Geo Address Maintenance
Geo Zone Maintenance
Geo Criteria Maintenance
Geo Schedule Maintenance
Numbered List Maintenance
Change Criteria
```

FIG. 33

```
TELECAS Warning System          Select Session              1:18:43 pm Fri
                             Sort by: Session Number
Start at:   17
—Session——Date———Time———Status———%Completed———Calls———Complete
    16   09/10/93  11:03  Calling     100         10         10
>   17   09/10/93  13:01  Calling       0         84          0

F1-Select Record, Arrows, Page Down, Page Up, Esc-Exit
```

FIG. 34

TELECAS Warning System                                    1:19:45 pm Fri

──────────────── Cancel Sessions ────────────────

This Session Contained    84  Total Calls
                           0  Calls Were Completed
                           0  % Completion (press <RETURN> to continue)

FIG. 35

TELECAS Warning System                    Select Session                01:35:04 pm Fri
                                    Sort by: Session Number Start at:   16
—Session——Date——Time——Status——%Completed——Calls——Complete
>   16   09/10/93  11:03  Calling         100         10        10

F1-Select Record, Arrows, Page Down, Page Up, Esc-Exit

FIG. 36

Telecas   ABC COMPANY CARROLLTON KY   Serial #: 000123 01:36:07 pm Fri
Geo/List Calling Bulletin Board   Scheduled Calling System Maint. Exit Make Calls
Stop Calls
Calling Log
Geo Message Maintenance
Geo Address Maintenance
Geo Zone Maintenance
Geo Criteria Maintenance
Geo Schedule Maintenance
Numbered List Maintenance
Change Criteria

FIG. 37

Telecas    ABC COMPANY CARROLLTON KY    Serial #: 000123 01:37:06 pm Fri
Calling Logs
―――――――――――― Calling Logs ――――――――――――
Session Number:    17
Date:              09/10/93
Time:              13:01
F1-Display Sessions, F2-Display Log, F4-Print Log, Esc-Exit.

FIG. 38

Telecas  ABC COMPANY CARROLLTON KY  Serial #: 000123  01:40:36 pm Fri
Calling Logs ─────────────── Calling Logs ───────────────

Session Number:     17
Date:           09/10/93
Time:            13:01
F1-Display Sessions    F2-Display Log, F4-Print Log, Esc-Exit.

─────────────── Select Session ───────────────
                            Sort by: Session Number
Start at:
──Session──Date────Time──Status────% Completed──
>    8   09/07/93  15:11  Called        0
     7   09/07/93  15:08  Called        0
     6   09/03/93  19:46  Called       17
     5   09/03/93  19:38  Called       26
     4   09/03/93  19:32  Called       23
     3   09/03/93  19:31  Called        0
     2   09/03/93  19:18  Called       25
     1   09/03/93  19:11  Called       24

F1-Select Record, Arrows, Page Down, Page Up, Esc-Exit

FIG. 39

```
Telecas    ABC COMPANY CARROLLTON KY    Serial #: 000123 01:41:01 pm Fri
Calling Logs
                    ─── Calling Logs ───
Session Number:         6
Date:               09/03/93
Time:                19:46
F1-Display Sessions, F2-Display Log, F4-Print Log, Esc-Exit.
```

FIG. 40

Telecas   ABC COMPANY CARROLLTON KY   Serial #: 000123  01:41:33 pm Fri
Calling Logs

```
┌─────────────────────────────────────────────────────────────────────────┐
│ Session #:    6   Date:09/03/93   Time: 19:46                           │
│ Seq:              Status: Called                                        │
│                                  Calls                                  │
│ Type──Address #─────Phone #──────────Status────────DTMF──Date────Time── │
│ List  ^L 014-00007  18126675899Message Played            09/03/93 19:50 │
│ List  ^L 014-00006  7325700    Busy                      09/03/93 19:49 │
│ List  ^L 014-00005  7325023    Message Played            09/03/93 19:49 │
│ List  ^L 014-00004  7328292    Message Played            09/03/93 19:49 │
│ List  ^L 014-00003  7329328    Message Played            09/03/93 19:49 │
│ List  ^L 014-00002  7328554    Message Played            09/03/93 19:50 │
│ List  ^L 014-00001  7325700    Message Played            09/03/93 19:49 │
│ List  ^L 014-00007  18126675899Message Played            09/03/93 19:48 │
│ List  ^L 014-00006  7325700    Message Played            09/03/93 19:50 │
│ List  ^L 014-00005  7325023    Message Played            09/03/93 19:48 │
│ List  ^L 014-00004  7328292    Message Played            09/03/93 19:48 │
│ List  ^L 014-00003  7329328    Message Played            09/03/93 19:48 │
│ List  ^L 014-00002  7328554    Busy                      09/03/93 19:49 │
│ List  ^L 014-00001  7325700    Message Played            09/03/93 19:48 │
│                                                                         │
│ Page Down, Page Up, Esc-Exit                                            │
└─────────────────────────────────────────────────────────────────────────┘
```

FIG. 41

```
Telecas    ABC COMPANY CARROLLTON KY    Serial #: 000123  01:44:56 pm Fri
Calling Logs
                        ┌─────────── Calling Logs ───────────┐
Session Number:         │        6                           │
Date:                   │   09/03/93                         │
Time:                   │     19:46                          │
                        ├─────────── PRINT LOG ──────────────┤
Log Printout            │                                    │
                        │                                    │
Session:                │       6                            │
Geo Zone/List Detail:   │   Y (Y/N)                          │
Include Calls:          │   A  (A)ll Calls, (D)elivered, (N)on-Devlivered
Include Responese:      │      ( )All Respones, (0-9)Response│
                        │                                    │
F1-Print, Esc-Exit.     │                                    │
                        └────────────────────────────────────┘

FIG. 42
```

Telecas    ABC COMPANY CARROLLTON KY    Serial #: 000123 01:45:34 pm Fri
Calling Logs ─────────────── Calling Logs ───────────────

Session Number:         6
Date:             09/03/93
Time:                19:46

Log Printout
─────────────── PRINT LOG ───────────────

Session:                6
Geo Zone/List Detail: Y (Y/N)
Include Calls:       A  (A)ll Calls, (D)elivered, (N)on-Devlivered
Include Responese:      ( )All Respones, (0-9)Response F1-Print, Esc-Exit.
Please Wait - Printing In Progress

FIG. 43

```
Telecas    TEST              Serial #: 000123   Version: 1.0
Change Criteria as a Result of a Calling Session
                        Calling Session  1

Criteria:
Response Key   #  Description              New Value (*/S/ )

"1"                                         0
   "2"                                         0
   "3"                                         0
   "4"                                         0
   "5"                                         0
   "6"                                         0
   "7"                                         0
   "8"                                         0
   "9"                                         0
   "0"                                         0

F1-Display Sessions, F2-Save Changes, Esc-Exit.
```

FIG. 44

```
Telecas   TEST            Serial #: 000123   Version:1.0
Change Criteria as a Result of a Calling Session
                        Calling Session 1

Criteria:
Response Key    #   Description              New Value (*/S/ )

"1"           3   NEIGHBORHOOD WATCH              *
  "2"           5   BLOCK CAPTAINS                  S
  "3"           1   BUSINESSES                      *
  "4"           2   RESIDENTIAL                     S
  "5"          10   MEDIA                           S
  "6"           4   BUSINESS WATCH                  *
  "7"           7   OTHER                           *
  "8"           8   TEST SITES
  "9"           6   HANES OPEN
  "0"           9   NON-PARTICPANTS

F1-Display Sessions, F2-Save Changes, Esc-Exit.
```

FIG. 45

```
Telecas    TEST           Serial #: 000123   Version:1.0
Change Criteria as a Result of a Calling Session
                Calling Session   1
       Criteria:
                Select Session           Sort by: Session Number
Start at:    0
—Session——Date——Time——Status——% Completed——Calls——Complete
>    1   02/28/94  16:29   Called       100           971       971

F1-Select Record, Arrows, Page Down, Page Up, Esc-Exit
```

FIG. 46

```
Telecas   TEST              Serial #: 000123    Version:1.0
Change Criteria as a Result of a Calling Session
                   Calling Session 1
                   ───────────────────

Criteria:
Response Key  # Description              New Value (*/S/ )

┌─────> WARNING <─────┐
                      │                     │
                      │ Once the Criteria Have Been Changed │
                      │ the Original Values are GONE FOREVER. │
                      │ Be Sure You Want to Save These │
                      │ Changes BEFORE You Continue. │
                      │                     │
                      │ ENTER-Continue, ESC-Exit │
                      └─────────────────────┘

"1"
  "2"
  "3"
  "4"
  "5"
  "6"
  "7"
  "8"
  "9"      9  NON-PARTICPANTS                  *
  "0"

F1-Display Sessions, F2-Save Changes, Esc-Exit.
```

FIG. 47

```
Telecas   TEST                Serial #: 000123   Version: 1.0
Change Criteria as a Result of a Calling Session
                    Calling Session. 1

Criteria:
Response Key  #   Description              New Value (*/S/ )

"1"         3   NEIGHBORHOOD WATCH          *
  "2"         5   BLOCK CAPTAINS              S
  "3"         1   BUSINESSES                  *
  "4"         2   RESIDENTIAL                 S
  "5"        10   MEDIA                       *
  "6"         4   BUSINESS WATCH              S
  "7"         7   OTHER                       *
  "8"         8   TEST SITES
  "9"         6   HANES OPEN
  "0"         9   NON-PARTICPANTS            12

Calls Read:    841   Changes Made:

F1-Display Sessions, F2-Save Changes, Esc-Exit.
```

FIG. 48

SAMPLE DATA RECORD

```
LAST CALL                          LIST DATA
    DATE                               LIST STATE
    TIME                               LIST COMMENT 1
    TIME-DISP                          LIST COMMENT 2
        TIME-HRS                   OK DATA
        TIME-MINS                      OK COMMENT 1
LAST CALL STATUS                       OK COMMENT 2
CURRENT STATUS                     OK PHONE 1
DAY NIGHT SCHEDULE                     OK AREA CODE 1
PHONE NUMBER                           OK EXCHANGE 1
BOX                                    OK LOCAL 1
    BOX DEF                        OK PHONE 2
    BOX NUMBER                         OK AREA CODE 2
PHONE                                  OK EXCHANGE 2
    AREA CODE                          OK LOCAL 2
    EXCHANGE                       OK TIME 1
    LOCAL NUMBER                       OK TIME 1 HRS
FAX NUMBER                             OK TIME 1 MINS
    AREA CODE                      OK TIME 2
    EXCHANGE                           OK TIME 2 HRS
    LOCAL NUMBER                       OK TIME 2 MINS
ADDRESS                            OK TIME 3
    NAME                               OK TIME 3 HRS
    ADDR1                              OK TIME 3 MINS
    ADDR2                          OK RETRIES
    CITY                           OK ALARM
    ZIP                            OK MESSAGE NUMBER
CHANGE ID                          OK CALLED 1
LAST CHANGE DATE                   OK CALLED 2
DELIVERED CHECK SUM                OK CALLED 3
GEO DATA                           OK STATE
    COORDINATES                    RESP DATA
        LONG                           RESP FLAGS
        LAT                        RESP ROTATION
    FLAGS                          RESP AVAILABLE
    DAY PRIORITY                   RESP ACTIVE SCENARIO
    NIGHT PRIORITY                 RESP ACTIVE SESSION
    UNLISTED                       RESP TIME
    BUSINESS                       RESP DATE
                                   RESP ARRIVE
```

FIG. 50

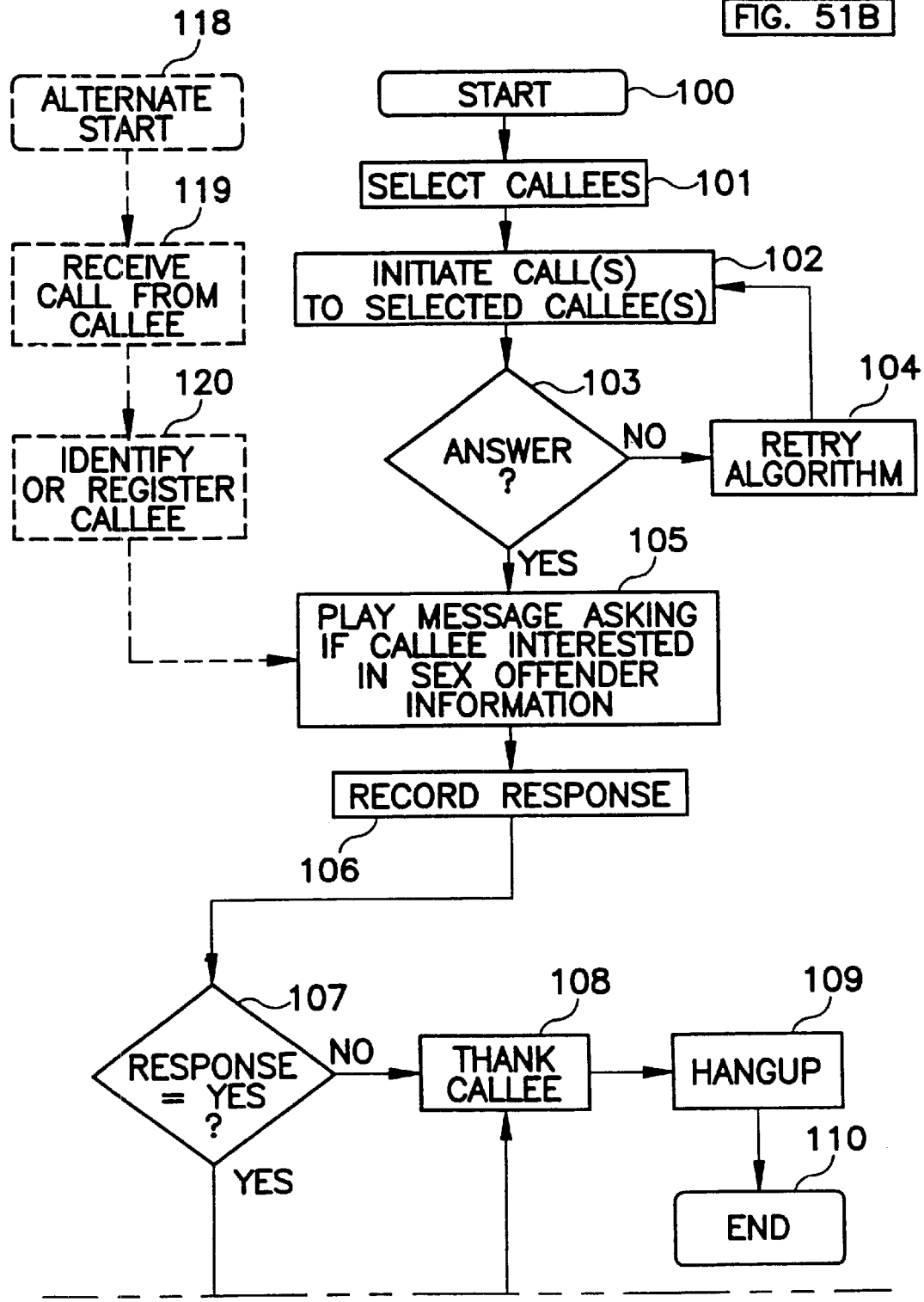

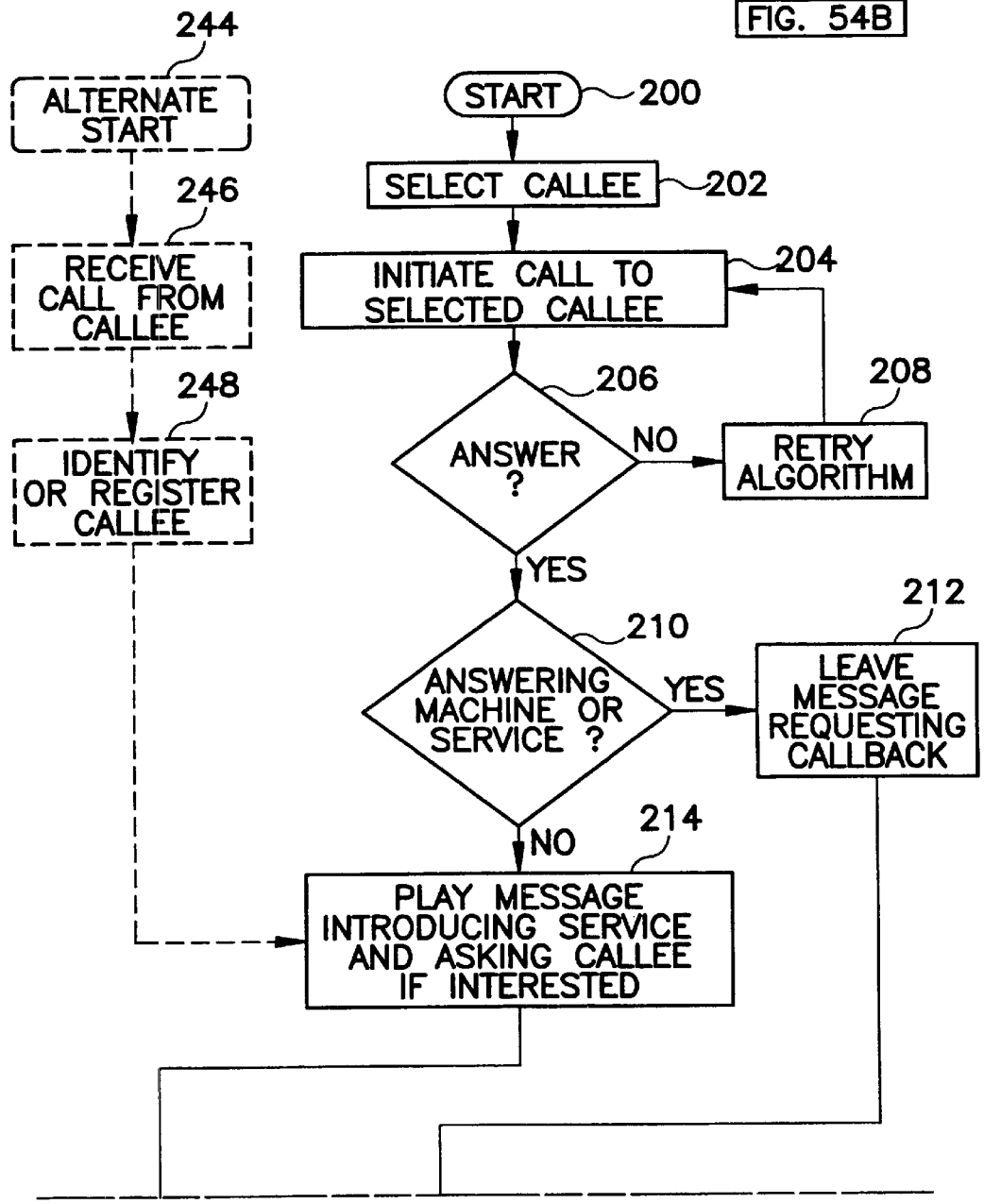

AUTOMATED CALLING SYSTEM WITH DATABASE UPDATING

CROSS REFERENCE TO RELATED APPLICATIONS

This application is a continuation-in-part of U.S. patent application Ser. No. 09/286,647, filed Feb. 3, 1999, which is a continuation-in-part of U.S. patent application Ser. No. 09/115,304, filed Jul. 14, 1998, now U.S. Pat. No. 6,009,149 which is a continuation-in-part of U.S. patent application Ser. No. 08/717,495, filed Sep. 20, 1996, now U.S. Pat. No. 5,912,947, which is a continuation-inpart of U.S. patent application Ser. No. 08/262,923, filed Jun. 20, 1994, now U.S. Pat. No. 5,559,867.

FIELD OF THE INVENTION

This invention relates to telecommunications systems, and, in particular, to a system which initiates phone calls to phone numbers in a database and is interactive to thereby permit the callee to enter TOUCH TONE (DTMF, or dual tone multiple frequency) or vocal responses in response to prompts from the system.

BACKGROUND OF THE INVENTION

Technological advances in telecommunications systems have automated activities that had required human intervention. For example, in U.S. Pat. No. 4,054,756, processing of special services calls, such as person-to-person, collect, credit card and bill to third party calls, are automated to eliminate the need for a human operator to handle such calls. U.S. Pat. No. 4,761,807 discloses a system for transmitting audio messages between parties, thereby eliminating the need for a human receptionist. In another example, the automated system of U.S. Pat. No. 5,058,152 may serve as an intermediary between a subscriber to the system and the subscriber's potential customers, again eliminating the need for the subscriber to employ a receptionist.

Advances in technology have also resulted in the use of telecommunications systems for a myriad of purposes probably not contemplated by Mr. Alexander Graham Bell. Telemarketing is one such use. A telemarketing system in which an operator can view the response of the individuals called by the system is disclosed in U.S. Pat. No. 4,160,125. In addition to telemarketing, callers are able to play interactive games via the telephone interface game control system disclosed in U.S. Pat. No. 5,218,631. Goods and services can be marketed by telephone when using the invention disclosed in U.S. Pat. No. 4,071,698. Stock brokers can automatically notify their customers of changes in the market via the mass announcement systems disclosed in U.S. Pat. Nos. 4,554,418 and 4,942,616. Also, pre-recorded messages can be transmitted in the announcement systems of U.S. Pat. No. 4,446,336.

Another attractive use of the telecommunications system is a mass communication system for communicating important messages to the public. For example, it may be desirable to provide an automated system which can inform the public of an impending emergency or a disaster, or to provide a public service message. For mass communication purposes, the system must retain a database containing the telephone numbers of the public to be serviced by the system. Also, since it is unlikely that all members of the public need to be provided with the informative message, a means must be provided, and data must be accessible, for selecting certain criteria associated with the system's subscribers. For example, information about an impending emergency, such as a tornado warning, need only be transmitted to those in a particular locality. Therefore, emergency alert systems have been developed, such as the MINUTEMAN public alert system offered by United Signal of America in Indianapolis, Ind., which allows one to select a particular geographic area to be informed of an alert or emergency situation.

When selecting a geographical area, various methods are known in the art for associating a telephone number with the corresponding location. One simple method involves associating the telephone number with a predetermined zone designated by an alphanumeric such as A-I or B-2 which corresponds to sections on a map. In the aforementioned MINUTEMAN public alert system, X-Y coordinates are associated with each phone number in the system's database. The operator may prepare a map showing geographic zones associated with each coordinate area.

One shortcoming of prior art systems using geographic zones selection as a criteria for determining to whom the message is to be sent occurs when the zone to be selected is of a size significantly different from the size of the grid employed by the system. Though the MINUTEMAN system described above allows a grid size to be redefined, when operating in an interactive mode, if a large geographical area is to be contacted by the system, prior art systems require the operator to enter a list of grids to encompass a large enough area. The size of the grid in prior art systems is therefore critical. To avoid encountering an unacceptable time delay by entering such a list (for example, it may be imperative that the message be communicated within a very short period of time due to the nature of the message), the grids are likely to be sized to err by reaching those who need not be informed rather than risk the inability to reach anyone. Therefore, it is desirable to provide a system providing greater flexibility to the system's operator for the selection of the Geographic Zone.

One of the shortcomings associated with many mass communication announcement systems such as public alert system is the inability of the public to control its participation in the service. Given the increased frequency for which the telephone is being used for telemarketing and solicitations, many people are resistant to participate in an automated service over which they have no control, particularly if such a service is to be provided by an organization, such as the police department, which is funded, at least in part, by taxes they have paid in the community. Thus, even though the service may be beneficial to the community, an individual may wish not to participate or to limit its participation. For example, the individual may only wish to participate during certain times or days, or to only be informed of certain occurrences. If, for example, the system is used by a law enforcement agency for informing the public of a recurring problem in the area, such as the theft of children's bicycles, not every individual or residence in the designated geographical area are interested in receiving such a message. There is also the possibility that the members of the household may wish to screen certain members of the residence from receiving such calls. A parent, for example, may not want the message to be transmitted to a six-year old child in the home. Therefore, it is desirable to provide a mass communication announcement system which permits the public to individually control its level of participation in a service implementing the system.

Recently, the U.S. government and various states have enacted laws requiring that convicted sex-offenders register with a law enforcement agency or government authority. Such laws include the federally enacted Megan's Law and Indiana's Zachary's Law, for example, which require that the offender make known his residence to a designated authority. Interested persons can generally inquire of the registering authority whether such an offender is in an area proximate the person's own residence or in areas where that person's children may frequent. At present, however, the residences of offenders is not easily accessible by the public, and, when available, the registration authority is often bothered with frequent requests for information which consumes the authority's valuable personnel resources and ties up its communication lines. These problems also detract from the authority's other duties which is particularly of concern if many of the callers do not reside near such an offender and therefore did not need to receive any information. Therefore, it is desired to provide a public notification system and method for notifying the public for relevant information about the residences of convicted sex-offenders.

Another problem with public notification systems relates to obtaining a database of phone numbers for an area and information regarding the geographic location of each phone number. While databases supplied by phone companies may contain all or most phone numbers, the addresses for such numbers may be missing for a significant portion of the phone numbers, because some phone customers request that their addresses not be published.

OBJECTS OF THE INVENTION

One object of the invention is to provide a system that allows callees to be selected for transmission of a prerecorded message based on the callees response to a previously transmitted prerecorded message, and to automatically update a callee database based on such a response.

Another object of the invention is to allow callees to be selected by their geographic location.

Another object of the invention is to provide a means for allowing a caller to indicate geographic information for his or her phone location.

BRIEF DESCRIPTION OF THE DRAWINGS

FIG. 4 shows a computer generated screen displayed to permit the operator to select callees for a calling session.

FIG. 5 shows a computer generated screen displayed to permit the operator to select callees for a calling session, and wherein the entries are viewed in description order rather than in list order as is shown in FIG. 4.

FIG. 6 shows a computer generated screen displaying the default message for the SITE SUPERVISOR Numbered List.

FIG. 7 shows a computer generated screen displaying a list of messages that may be executed or modified.

FIG. 8 shows a computer generated screen presenting the user with a scratch pad for entering a textual message.

FIG. 9 shows a computer generated screen indicating that a textual message written on the scratch pad has been saved.

FIG. 10 shows a computer generated screen prompting the operator to voice record the message written on the scratch pad.

FIG. 11 shows a computer generated screen informing the operator that voice recordation of the message is complete.

FIG. 12 shows a computer generated screen similar to the screen of FIG. 7, and indicating that the Example Message has now been recorded.

FIG. 13 shows a computer generated screen displayed in response to depressing the F6 key when viewing the screen of FIG. 12 indicating that the selected message is being played.

FIG. 14 shows a computer generated screen instructing the operator to return the telephone to the hook after a message has completed playing.

FIG. 15 shows a computer generated screen similar to that of FIG. 7 wherein the operator has depressed the F8 key to copy a message.

FIG. 16 shows a computer generated screen informing the operator that a new message at line 319 has been created.

FIG. 17 shows a computer generated screen similar to that of FIG. 4 indicating that the SITE SUPERVISOR Numbered List has been selected by the operator.

FIG. 18 shows a computer generated screen showing which Numbered Lists have been selected by the operator.

FIG. 19 shows a computer generated screen displayed in response to depression of the F1 key when viewing the screen of FIG. 18 and displaying a list of messages that may be changed.

FIG. 20 shows a computer generated screen displayed in response to depression of the F3 key when FIG. 17 is displayed prompting the operator to indicate which list entry is to be deleted.

FIG. 21 shows a computer generated screen similar to that of the screen FIG. 20 wherein the SITE SUPERVISOR Numbered List has been deleted.

FIG. 22 shows a computer generated screen similar to the screen of FIG. 17 wherein the operator has depressed the F7 key to change the list priority.

FIG. 23 shows a computer generated screen prompting the operator to enter the new priority for the Numbered List selected in FIG. 22.

FIG. 24 shows a computer generated screen similar to that of FIG. 22 wherein the priority of FIRE BRIGADE has been changed from 1 to 2.

FIG. 25 shows a computer generated screen illustrating a sample screen for selecting a Geographical Zone.

FIG. 26 shows a computer generated screen similar to the screen of FIG. 25 wherein the F7 key has been depressed and the operator is prompted to enter the Zone to be changed.

FIG. 27 shows a computer generated screen presenting zone information for a particular calling session.

FIG. 28 shows a computer generated screen informing the operator of the messages to be sent during a particular calling session.

FIG. 29 shows a computer generated screen showing the call generation results in response to depression of the F9 key while at the prompt in FIG. 28.

FIG. 30 shows a computer generated screen resulting from the depression of the F9 key while viewing the screen of FIG. 29 and showing the activity of the calling session.

FIG. 31 shows a computer generated screen prompting the operator to enter a password to begin or continue the calling session.

FIG. 32 shows a computer generated screen indicating the total number of calls queued as well as the designated number of the particular calling session.

FIG. 33 shows a computer generated screen showing the Main Menu will the Stop Calls line highlighted.

FIG. 34 shows a computer generated screen listing the calling session currently in progress, and resulting from selection of the Stop Calls function in FIG. 33.

FIG. 35 shows a computer generated screen showing the status of a calling session selected in FIG. 34 to be canceled.

FIG. 36 shows a computer generated screen like that of FIG. 34, but wherein calling session 17 has been canceled.

FIG. 37 shows a computer generated screen showing the Main Menu with the Calling Log line highlighted.

FIG. 38 shows a computer generated screen resulting from selection of the Calling Log function in FIG. 37, and prompting the operator to select one of the displayed Calling Log function options.

FIG. 39 shows a computer generated screen displayed in response to the depression of the F1 key while FIG. 38 is displayed and showing the current status of the calling session selected.

FIG. 40 shows a computer generated screen similar to the screen of FIG. 38 in which calling session 6 has been selected to be displayed or printed.

FIG. 41 shows a computer generated screen resulting from the depression of F2 while viewing FIG. 40 which displays the report for calling session 6.

FIG. 42 shows a computer generated screen resulting from the depression of the F4 key while viewing FIG. 40 and which prompts the operator to begin printing calling session 6.

FIG. 43 shows a computer generated screen like that of FIG. 42 informing the operator that printing of the report is in progress in response to depression of the F1 key while viewing FIG. 42.

FIG. 44 shows a computer generated screen resulting from selection of the Change Criteria option from the Geo/List menu of FIG. 2.

FIG. 45 shows a computer generated screen like the screen of FIG. 44 wherein the operator has tabbed to the Criteria # Description column.

FIG. 46 shows a computer generated screen displayed in response to depression of the F1 key while viewing FIG. 45 and showing the calling session selected.

FIG. 47 shows a computer generated screen like that of FIG. 45 and warning the operator that criteria changes will result in permanent changes to the database.

FIG. 48 shows a computer generated screen displayed in response to depressing Enter while viewing the screen of FIG. 47.

FIG. 50 shows a data record containing representative data fields used in the database according to the present invention.

SUMMARY OF THE INVENTION

Accordingly, the automated calling system of the present invention includes a database comprising phone numbers and one or more data fields associated with each phone number. Phone numbers (callees) in the database may be selected based on the data fields associated therewith. A recorded voice message is transmitted to callees through a plurality of outgoing phone lines, and callees are prompted to enter one of several TOUCH TONE codes, rotary pulse codes, or vocal responses, which is recorded. The database record for the callee is automatically updated based on the TOUCH TONE code, rotary pulse code, or vocal response, so that the updated field may be used to select whether to send a future call to the callee.

DETAILED DESCRIPTION

Figure 1:
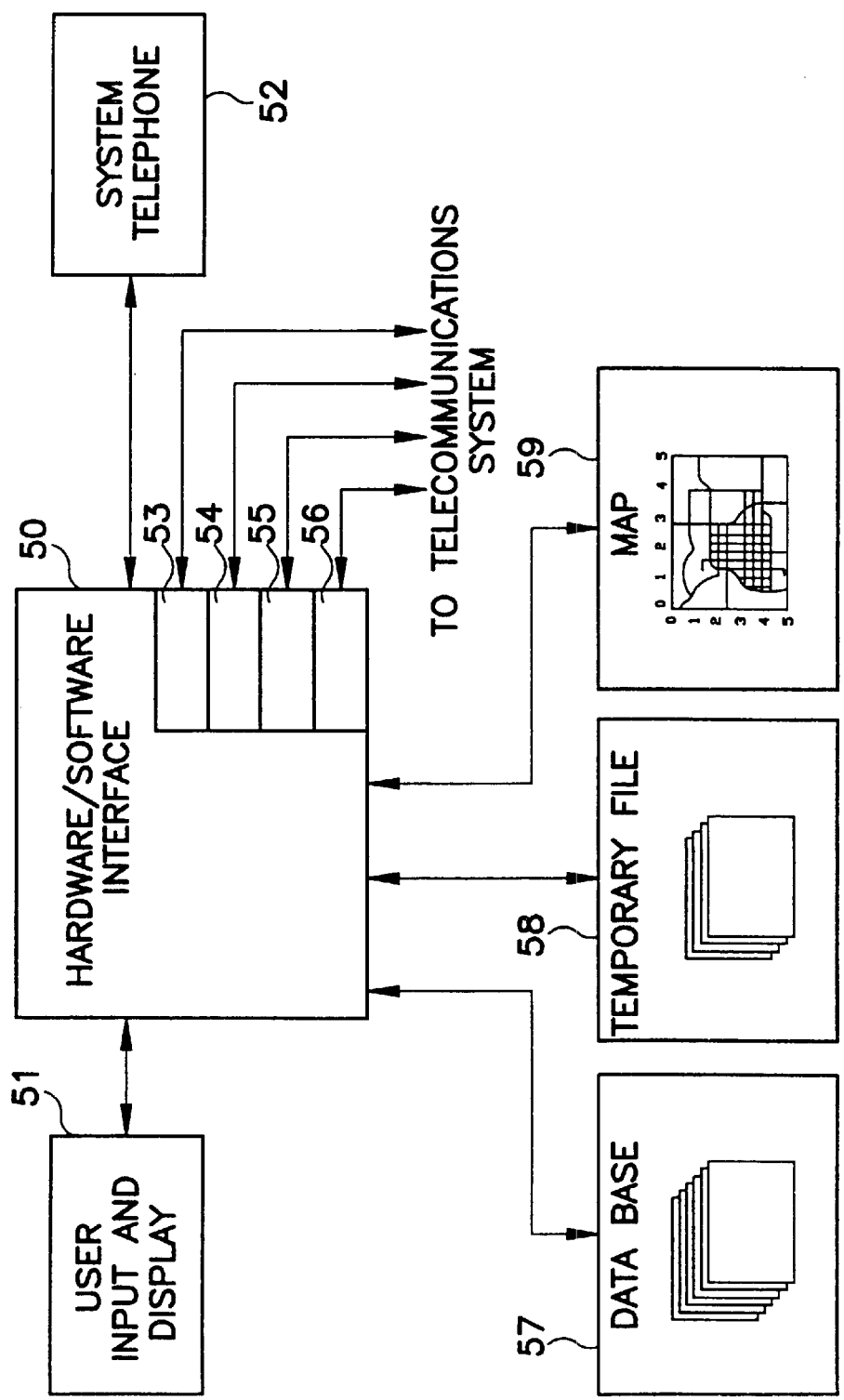
FIG. 1 shows a block diagram of one embodiment of the automated phone calling system of the present invention.

Referring now to FIG. 1, there is shown a block diagram of one embodiment of the automated phone calling system of the present invention. In this embodiment, the automated phone calling system includes hardware/software interface 50, user input and display 51, system or "local" telephone 52, telecommunications interfaces 53–56, database 57, temporary file 58, and map 59. The system may comprise a computer having an ISA, or other, bus and a plurality of plug-in phone cards as telecommunications interfaces 53–56. Database 57, temporary file 58, and map 59 may reside on magnetic media, such as a hard disc, or for the map, CD ROM, for example. Map 59 may also be a physical hard copy of a map having grid coordinates written thereon, rather than residing on magnetic media. When a hard copy map is employed, the operator will be required to input desired coordinates by keyboard, for example, rather than selecting the coordinates by other means, such as graphical means, on the computer. User input and display 51 may comprise a keyboard and monitor and/or printer connected to the personal computer.

User input and display 51 is in bidirectional communication with hardware/software interface 50. In this manner, the operator may provide input to hardware/software interface 50, hardware/software interface 50 may make inquires of the operator, and reports created by hardware/software interface 50 may be presented to the operator.

"Local" telephone 52 is also in bidirectional communication with hardware/software interface 50. As described herein, "local" telephone 52 is used by hardware/software interface 50 to record voice messages used by the system and to play recorded voice messages to the operator for verification purposes. In this embodiment, "local" telephone comprises a TOUCH TONE telephone having a telephone access number which is known by hardware/software interface. The TOUCH TONE capability is utilized on "local" telephone 52 to provide the operator with the capability to respond to inquires by hardware/software interface 50. It will be appreciated that other means well known in the art may be used for recording and playing messages and providing responses to inquires of hardware/software system 50. For example, interactive microphone and speaker accessories for personal computers are available which could be utilized in lieu of "local" telephone '52. An advantage is present, however, in using a TOUCH TONE telephone for voice recordation and verification. Specifically, the operator and software use the same mechanisms for these functions as is used by the system in contacting callees, playing the voice message to the callee, and recording the answers of callees.

Database 57 contains telephone numbers for potential callees as well as several other data fields associated with that telephone number. Representative record layouts for database 57 are shown in U.S. patent application Ser. No. 08/262,923, which is incorporated herein by reference, and in FIG. 50. Because the system of the present invention is able to access callees based on the selection of a Numbered List of callees or on the Geographical Zone of callees in the embodiment of the system described below, these additional data fields may comprise the identifiers of the Numbered Lists to which that telephone number (callee) belongs as well as an indication of the geographical location of the telephone number.

As is described in further detail herein, database 57 is in bidirectional communication with hardware/software interface 50. Not only is hardware/software system 50 able to read the information stored in database 57, data fields in database 57 may be modified by hardware/software interface 50. The ability of the system to modify database 57 is not limited to configuration, set-up, or modification of database 57 by an operator interfacing with hardware/software interface 50 through user interface input and display 51. Rather, database 57 may be updated based on responses received from callees interacting with the system via telecommunications interfaces 53–56. In this manner, the callee may have control over future calls it may receive from the system.

For example, if a callee's record in database 57 contains data field(s) representative of the acceptable times at which the callee may be contacted and hardware/software interface 50 is programmed to only initiate calls to the callee during the specified hours, the system may permit the callee to indicate a different time from that stored in database 57. By updating the appropriate data fields in database 57, the callee has had an influence over future calls it may receive from the system.

As another example, if a callee's record in database 57 contains data field(s) representative of a geographical area over which the callee is interested in acquiring information about sexoffenders residing in that area, hardware/software interface 50 is programmed to only initiate calls to that callee when offenders enter into, reside in, or move out of that geographical area. However, the system permits the callee to effectively change the geographical area data field(s) stored in database 57, thereby providing the callee with the ability to control the system, at least with respect to calls made by the system to the callee with sex-offender information.

Temporary file 58 is used by hardware/software interface 50 to store temporary information required for initiating calling sessions. Such temporary information will be better understood by materials presented herein as to the operation of the automated phone calling system of the present invention.

It will be appreciated by those of skill in the art that database 57 and temporary file 58 are likely to be stored on non-permanent, i.e., writeable, media such as hard disk, diskette, or magnetic tape. Map 59, however, is more apt to be unchanged over long periods of time. Therefore, though non-permanent media may be used for storage of map 59, permanent media, such as CD ROM, may be desirable.

Telecommunications interfaces 53–56 are bidirectionally connected to a telecommunications network. Calls are made to callees through telecommunications interfaces 53–56 to the telecommunications network. Also, telecommunications interfaces 53–56 accept input, such as a TOUCH TONE input, provided by callees in response to inquiries made by the system.

Hardware/software interface 50 provides a multiplicity of functions which are described in greater detail herein. Briefly, hardware/software interface 50 provides a means for selecting one or more subsets of telephone numbers stored in database 57 based on data fields associated with the telephone numbers. Hardware/software interface 50 also provides a means for recording a voice message provided through "local" telephone 52, and provides a means for initiating telephone calls to callees through telecommunications interfaces 53–56. In addition, hardware/software interface 50 is capable of prompting the callee for entry of a TOUCH TONE code response and recording the response entered by a callee. Further, hardware/software interface 50 is capable of updating at least one data field in database 57 for a callee based on the TOUCH TONE response of that callee.

Establishing—Initiating, Stopping and Logging a Call Session

Figure 2:
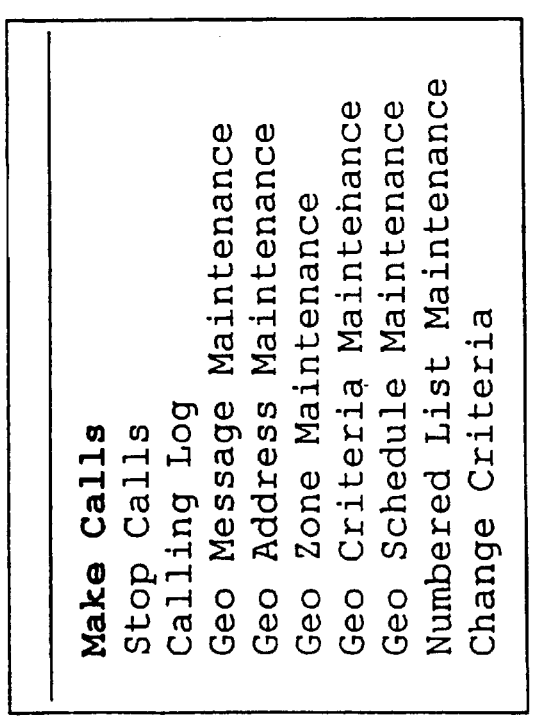
FIG. 2 shows a computer generated screen of the Main Menu of one embodiment of the automated calling system of the present invention.

To provide an understanding of the operation of the present invention, immediately following herein is a description of one embodiment of a software interface program operating in accordance with the present invention. Software source code and Record Layouts for this embodiment are presented in U.S. patent application Ser. No. 08/262,923. Record layouts for this embodiment are also presented in FIG. 50. Referring now to FIG. 2, there is shown a Main Menu screen presented to the user in the database interface software. On the Main Menu, there are several functions provided to the user. Specifically, the functions of Geo/List Calling, Bulletin Board, Scheduled Calling, System Maint. (maintenance), and Exit are provided. The discussion immediately following focuses on the functions made available under the Geo/List Calling Main Menu option. In particular, the Make Calls, Stop Calls, and Calling Log functions are discussed in detail. The Make Calls function under the Geo/List Calling Main Menu option allows the operator to select callees for a particular calling session and to initiate a calling session. Stop Calls allows the operator to stop calls ill the process of being made, and Calling Log allows the operator to obtain a log of calls made.

Figure 3:
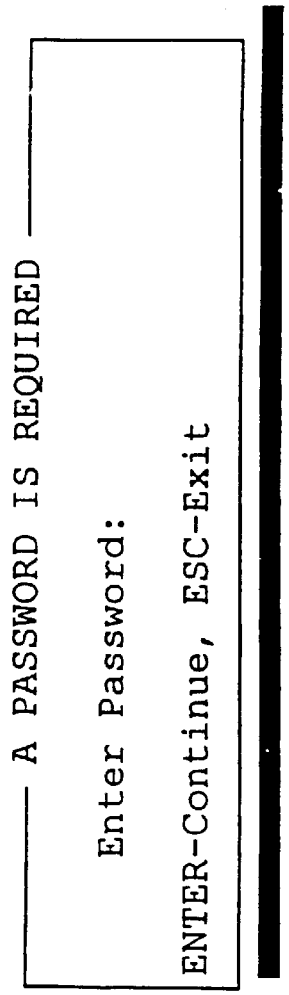
FIG. 3 shows a computer generated screen prompting the user for entry of a password required to make calls with the system.

To initiate a calling session, the operator highlights the Make Calls selection and presses the ENTER key. If a password is required for the particular selection made, as would most likely be required for initiating calls, the screen illustrated in FIG. 3 is displayed. In response to the prompt of the screen of FIG. 3, the operator is required to input a valid password to continue to initiate calls, for example. If the operator depresses the ESC (escape) key, the software will return to the previous screen of FIG. 2.

Throughout the operation of the software described herein, the ESC key may be depressed to return to the previous screen. Upon depression of the ESC key, the current action will be canceled without making any changes to the database. If the operator resides lower in the hierarchy of the software, continued depression of the ESC key will eventually take the operator to the Main Menu shown in FIG. 2.

Referring now to FIG. 4, there is shown a screen displayed to select the callees for a calling session. At this point, the operator is allowed to select two methods for selecting callees. The operator may select up to ten Numbered Lists of telephone numbers to be called, or by depressing the F9 key when the screen of FIG. 4 is displayed, the operator may select a Geographical Zone representative of a group of callees by geographical location and other optional criteria, to be called. The selection of Geographical Zone is described in further detail herein in association with FIGS. 25–27.

A Numbered List is simply a list of specific people to be called, such as members of a local volunteer fire department. These people may typically share a common responsibility or task. To select a Numbered List, the operator simply uses the arrow keys to highlight the appropriate list (the double greater than sign (">>") indicates the particular entry to be selected) and then depresses the F1 key to initiate selection of the list. In the screen of FIG. 4, the SITE SUPERVISOR Numbered List has been selected by the operator. The operator may also use the page up (PGUP) and page down (PGDN) keys to view lists on a different page. By default, the entries are in a list number order. The operator may view the entries in the description order by depressing the F6 key. FIG. 5, for example, shows the description order number list for the screen shown in FIG. 4.

If the F1 key is depressed in response to the displays of FIG. 4 or FIG. 5 with the cursor set at the field SITE SUPERVISOR, the screen in FIG. 6 results. The default message for this list, i.e., for the SITE SUPERVISOR Numbered List, is already highlighted. If this message is appropriate, the operator can select it by depressing the F1 key. If not, the operator has three other choices. The operator may select another message by using the arrow, PGUP, and PGDN keys to highlight another message. The operator may also modify an existing message or create a new one.

To create or modify the description for a message, the operator first highlights the appropriate message line to be executed or modified and presses the F2 key. In the screen of FIG. 7, the cursor is highlighting the EXAMPLE MESSAGE. Therefore, depression of the F2 indicates that the description EXAMPLE MESSAGE is to be created or modified. After modifying the description of the message, depression of the ENTER key indicates that the entry of a new description is complete.

If the F3 key is depressed while on the screen of FIG. 7, a scratch pad screen, such as that illustrated in FIG. 8, is displayed. The screen of FIG. 8 allows the operator to finalize the textual message before actually recording the message. It will be appreciated that it is much easier and more efficient to record a message by reading a script, rather than reciting the message from memory. Therefore, the scratch pad provides up to 15 lines of 75 characters for each message. The operator may leave blank lines on the scratch pad screen of FIG. 8 for improved readability. To insert a blank line, the operator simply places the cursor at the line where a blank line is to be inserted and presses the F3 key. The remaining lines on the screen will move down one line and the highlighted line will be blank. If the 15th line exists, the system will provide the operator with an audible tone, without adding a blank line. The operator may correct the situation if indeed additional information is to be added to the message by respacing or rewording the text of the first 15 lines.

The operator may also delete a line of text by depressing the F4 key. This will remove the remaining lines up one line and make the 15th line blank. Throughout creation of the message, the operator may press the ESC key to ignore any modifications or deletions immediately made prior to such depression. The operator may save the changes made to the message on the scratch pad of FIG. 8. Upon depression of the F2 key while at the screen of FIG. 8, a message window, as illustrated in FIG. 9, appears to assure the operator that changes have been saved. At this point, the textual message is now recorded. The operator may depress the ENTER key to return to the previous screen of FIG. 8. FIG. 10 shows the scratch pad screen of FIG. 8 after a textual message has been saved.

At this point, the operator may wish to voice record the textual message composed. Depression of the F4 key initiates the recording process. Upon depression of the F4 key, the system telephones the phone "local" to the phone 52 in the embodiment of FIG. 1. The operator should answer the telephone. From this point, recording the message is very similar to leaving the message on an answering machine. A voice prompts the operator to record the message at the completion of a tone. The operator may then read the message at the bottom part of the screen displayed on FIG. 10. Once the voice message is recorded, the operator may press the 3 key on the telephone pad or wait for the response message. The system will then respond with "Thank you for your time" to indicate the recording is complete. A message is displayed on the screen, as illustrated in FIG. 11, to show that the recording is complete. The message length is also displayed in seconds. To return the previous screen, the operator simply depresses the ENTER key.

In addition to entering a recorded message, the software interface system allows the operator to require that the callee respond to the telephone call. For example, the operator may invoke an option to require the callee to depress the 5 key on the telephone pad as a response that the callee has received the message. Such a response by the callee, or lack of response, will be recorded for reporting service purposes in the database. For the operator to add the option to require such a response, the operator should depress the F5 key at the screen of FIG. 12. Toggling the F5 key causes the YES/NO response listed on the right hand side of the screen for the particular message highlighted to toggle between YES and NO.

The final step in modifying the created main message is for the operator to listen to the message recorded. This gives the operator first hand experience of what the callee will hear and be asked to do. To listen to the message recorded, the operator depresses the F6 key when on the screen of FIG. 12. The screen of FIG. 13 is then displayed showing the textual script of the message. The system then telephones the phone connected to the system. The operator simply needs to answer the telephone. At that point, the recorded voice message will be played and, if requested, the operator, like a callee, will be asked to make a response by depressing the 5 key on the telephone.

Once the message has completed playing, a message is added to the screen of FIG. 13 to show that the operator should return the telephone to the hook and depress ENTER. This is illustrated in FIG. 14. By depressing ENTER, the operator will be returned to the screen of FIG. 7.

The operator may also delete a message, and the accompanying textual message stored. To delete a message, the operator simply should highlight the appropriate message and depress the F7 key while viewing the screen of FIG. 7. The message line will now be blank.

The operator may also copy a message from one message line to another. To copy a message, simply highlight the message to be copied and depress the F8 key while viewing the screen of FIG. 7. A window pops up, as shown in FIG. 15, prompting the operator for the destination message line number highlighted. In this example, message number 308 is being copied to message line 319. Depression of the ESC key allows the operator to avoid copying the message. If the correct destination number has been input, the operator simply depresses the ENTER key. The presence of a new message at line 319 is illustrated in FIG. 16. Note that the message length for this message is 0 and the valid message flag is NO. When a message is copied from one line to another, the operator must rerecord the voice message. The copy function only copies the description and the textual message, but not the voice message itself.

The screen shown in FIG. 17, is similar to that of FIG. 4, with the exception of the fact that the Numbered List SITE SUPERVISOR has been selected and is so indicated under the Entry List at the type of the screen selected. Once the operator has selected the necessary list or lists according to the procedure described herein, the operator may alter each selection. The operator may also change the message to be used or alter the priority of the calls for that list. Such flexibility eliminates having to delete and reselect a Numbered List. If the operator need not modify the individual Numbered List, depression of the F9 key allows the operator to continue to select Geographical Zone to be called.

FIG. 18 shows that four Numbered Lists have been selected, namely SITE SUPERVISOR, KEY STAFF MEMBERS, FIRE BRIGADE, and DAILY TEST CALL. To change a message for any one of the lists, the operator simply depresses the F2 key. A pop-up window appears, as shown in FIG. 18, and prompts the operator for the number of the list entry to be changed. After entering the number, the operator may change the message for the Numbered List. As before, depression of the ESC key allows the operator to exit the changed message prompt and make no changes to the entry.

If the operator opts to change a message for an entry by depressing the F1 key at the CHANGE MESSAGE prompt shown in FIG. 18, the screen of FIG. 19 is displayed. The options presented as when creating or modifying a message (see FIG. 7) are available for modifying a message. In fact, a similar procedure as described in association with FIGS. 7–14 is used to change an entry list message.

When the screen of FIG. 17 is displayed, the operator may also delete a Numbered List from the calling session by depressing the F3 key. Depression of the F3 key displays the screen illustrated in FIG. 20 having a pop up prompt asking the operator to enter the number to be deleted. The operator may enter a number to be deleted and then depress the F1 key to delete the entry, or press the ESC to exit. If, the entry to be deleted is entry 1 in that of FIG. 20, i.e. SITE SUPERVISOR, and the F1 key is depressed, the screen illustrated in FIG. 21 is displayed. Note that the list number one for SITE SUPERVISOR as shown in FIG. 20 is not displayed in FIG. 21. It is important to note that deleting a Numbered List from a calling session does not delete the Numbered List from the system. Deletion of an entry is simply a way of unselecting a selected list for the particular calling session.

Returning to FIG. 17, it is also possible to change the calling priority of a selected list for this calling session only. Depression of the F7 key allows one to change the list priority. A pop-up window, such as that shown in FIG. 22, is displayed to prompt the operator for the number of the entry to change. Consistent with other operations, to change the priority, the entry number is entered and the F1 key is depressed. Depression of the ESC key allows the operator to return without making a change to the list priority. If the F1 key is depressed, as illustrated in FIG. 23, the operator will be prompted to enter the new priority, i.e., priority 1, 2 or 3, for the Numbered List and to depress the F1 key to update the priority, or press the ESC key to return to the previous screen. The operator may also depress the F2 key to change this message. The options discussed before when creating and modifying a message are available when the F2 key is depressed to change the message.

After changing the priority of the selected list, the screen of FIG. 24 is displayed. Comparing the screen of FIG. 22 to the screen of FIG. 24, the list number 8, FIRE BRIGADE, was changed to a priority of 2. Note that the changing of the priority of a selected list does not change the default calling priority for that Numbered List. It only affects the list priority for the particular calling session.

Once the operator has completed selecting the Numbered List to call and the priorities associated therewith, depression of the F9 key while at the screen of FIG. 7 allows the operator to select Geographical Zones. Therefore, both Numbered Lists and Geographical Zones may be selected for a particular calling session. In one embodiment of the invention, a Geographic Zone includes a subset of all potential callees in a predetermined geographic area. The criteria for selecting a particular subset may be specified by flagging fields associated with each callee.

FIG. 25 shows a sample screen for selecting Geographical Zone (Geo). Up to 10 specific Geo Zones may be selected by the operator. The operator need not enter all Numbered Lists before selecting Geographical Zone, and vice versa. The software allows selection of Numbered Lists as well as selection of Geo Zones. The operator may switch to the other type of call designation by depression of the F8 or F9 key, appropriately, when in either the select Zones or select Numbered Lists screens.

Figure 49:
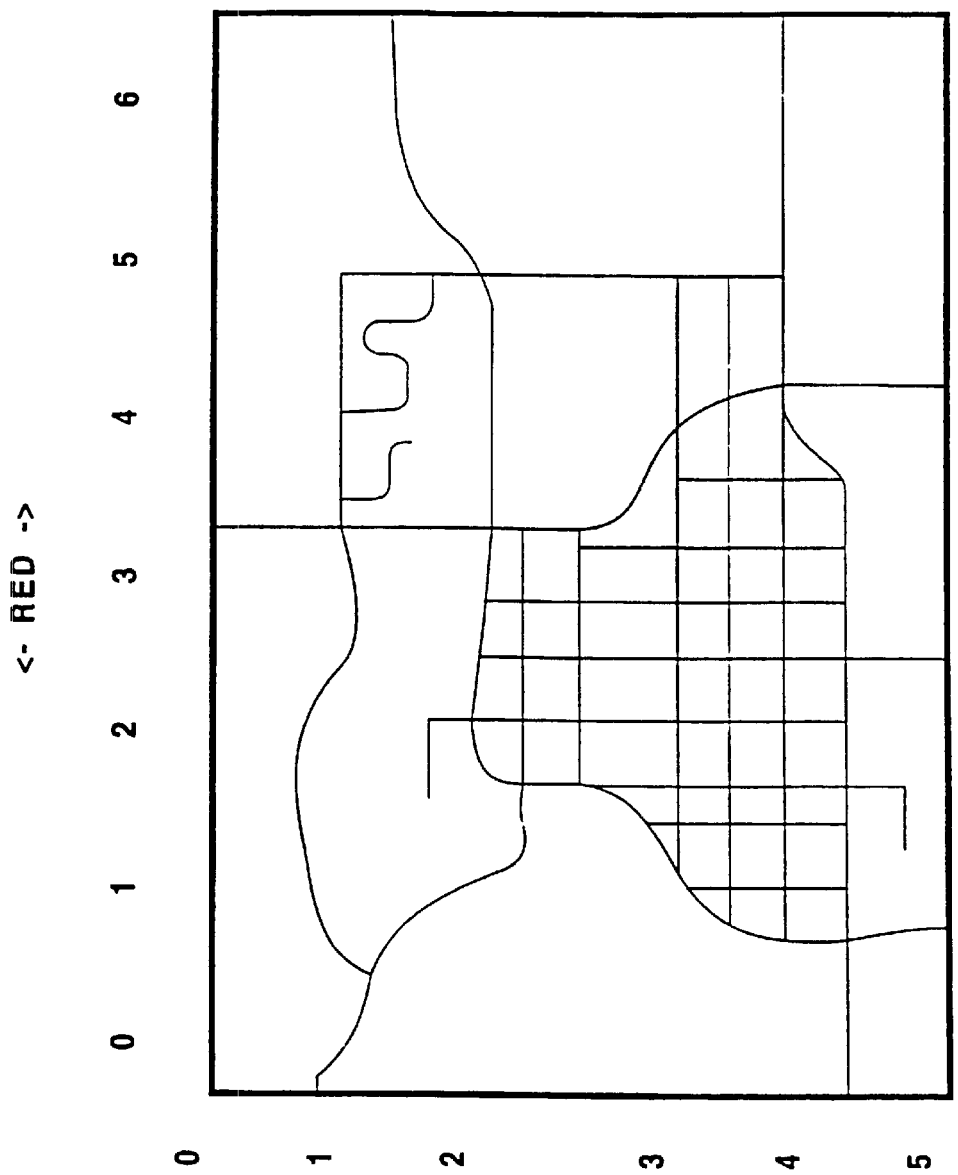
FIG. 49 shows a geographic area map which may be used to specify callees to whom to place a call to transmit a prerecorded message.

A Geo Zone is a name for a group of callees in the database that meet specified criteria. In one embodiment, a Geo Zone may be established by specifying coordinates associated with a map and specifying criteria associated with each record in the phone callee database. For example, as shown in FIG. 49, the top or X axis is red and contains horizontal coordinates 0–6, while the side or Y axis is green and specifies vertical coordinates 0–5. A Geo Zone may be specified as shown in FIG. 27 by specifying the upper left and lower right corners of a rectangle. For example, in FIG. 49, the coordinates for a northwest quadrant of the map would be Red: 0, Green: 0; and Red: 3, Green: 2. The coordinates for a Geo Zone which initially qualifies all callees in the database to be included (subject to subsequently specifying selection criteria) would be Red: 0, Green: 0; and Red: 6, Green: 5.

In one embodiment, the phone number database stores geographic information for each callee (phone number) by longitude and latitude, and each such longitude and latitude may be unique for each callee database record. The longitude and latitude may be initially established by visiting each address and obtaining the longitude and latitude from a commercially available global positioning system satellite receiver. Alternatively, the longitude and latitude could be obtained by inputting a database of the streets and addresses for the geographic area of interest into a computer, along with a reference longitude and latitude and scaling information, and automatically associating a longitude and latitude for each address. However, the latter alternative will likely require a manual confirmation of each automatically assigned preliminary longitude and latitude due to the difficulty in perfecting a software program for generating such information automatically. However, the invention in its broadest scope does not require geographic information for each callee to be generated automatically, or to be stored in a longitude—latitude format.

Geo Zones may be established by other criteria as well. For example, since telephone exchange numbers within an area code are generally representative of a geographic location, telephone exchange numbers may serve as a Geo Zone. Similarly, the actual address, either street address or city, for example, may also be used to establish a Geo Zone.

In one embodiment of the invention, once a geographic area is defined, callees within the area may be added by specifying criteria to create the formal Geo Zone. For example, a field may be associated with each phone number (callee) record indicating whether the phone number is for a business or a residence. Assuming that every phone number is either a business or a residence, selecting both these criteria would result in every callee in the geographic area being included in the Geo Zone. Other examples of filter fields that may be associated with callee record include whether the callee has previously indicated a desire to participate in the automated calling system, the preferred time of day to place an automated call, whether children reside at the callee's address, or whether the callee has previously expressed a desire to be informed of public zoning hearing for land near the callees location. Importantly, a criteria may be based on a TOUCH TONE keypad response (or a vocal response, as described below) that the callee has made during a prior automated calling session that included the callee. In this sense, the term Geo Zone is a somewhat of a misnomer because callees within a Geo Zone may be selected based on criteria in addition to their geographic location.

When a Geo Zone is selected, the system will identify all callees residing in that area and call them with the message chosen. At the bottom of the screen shown in FIG. 25 is a list of available Geo Zones to select. The selection of Geo Zones is accomplished in a manner similar to that used for Numbered Lists. The operator may use the PGUP and PGDN keys to display additional pages, and may use the arrow keys to move among the displayed list of Geo Zones. The operator may change the order of display of the Geo Zones by toggling the F6 key which will alternately display Geo Zone number order and the description order for Geo Zones. In the screen of FIG. 25, the F1 key was depressed to select Zone 1, NORTH-WEST OF PLANT, and the default message for the zone NORTH-WEST OF PLANT was chosen.

The selection process for selecting Geo Zones is essentially identical to the selection of Numbered Lists described herein above. Once the appropriate Zones have been selected, the message may be changed for a particular calling session. The Zone may be deleted from the calling session, or the operator may change the Zone to be called. The functions "change messages" and "delete entry" presented in FIG. 25 are essentially identical to the counterparts for selecting Numbered Lists.

To change a Geo Zone entry, the operator should depress the F7 key while residing at FIG. 25. The pop-up window illustrated in FIG. 26 prompting the operator to enter the Zone to be changed is displayed. Depression of the ESC key will not change the Zone whereas depression of the F1 key will change the Zone entry made.

If the F1 key is depressed while viewing the screen of FIG. 26, the screen illustrated in FIG. 27 is shown. The screen presents information to allow the operator to change the Geo Zone for this particular calling session only. The operator may change the message to be used, the unlisted flag, the boundaries of the Zone itself, and the criteria for including people (callees) in the Zone. In the embodiment shown in FIG. 27, there are 39 calling criteria for each phone number record which may be used. However, only the first three have been defined. In addition, as shown by lines 1 and 2 in FIG. 27, the user has specified that both business and residential callees should be included, as indicated by the "I" following the 1 and the 2. If every callee is defined to be either a business or residence, this will select every callee in the specified geographic area. Obviously, caution should be exercised in changing these parameters as it can make quite an impact on the calling session. If the operator is certain of the changes entered, the F1 key may be depressed to update the Zone's parameters for the calling session. Otherwise, depression of the ESC key allows the operator to leave this screen without changing the selected Zone's parameters. Again, changing the Zone's parameters for the calling session does not change the default parameters for this Zone. Such changes only affect the Zone's parameters for this particular calling session.

Once the necessary Zones have been selected, the operator may depress the F9 key to accept all Numbered Lists and Geo Zones entered. Upon depression of the F9 (accept) key, the screen illustrated in FIG. 28 will be displayed. This screen displays all messages to be used in the calling session. The presentation of the screen provides the operator with an opportunity to modify and/or change the messages for the calling session. If the operator is satisfied with the messages displayed in FIG. 28, depression of the F9 key allows the operator to continue. Otherwise, depression of the ESC key allows the operator to return to the select Geo Zone screens illustrated in FIG. 25.

Depression of the F9 key at the prompt in FIG. 28, results in display of the call generation result screen of FIG. 29. The call generation screen displays the Lists and/or Zones to be called, the respective messages to be used for each List and/or Zone, and the number of calls to be made for each List/Zone. If this information is correct, depression of the F9 key allows the operator to continue to the next screen and accept all data for the calling session. Again, depressing the ESC key returns the operator to the select Geo Zones screens.

Depression of the F9 screen from FIG. 29 results in the display of the screen of FIG. 30. At this screen, the operator may actually begin the calling session. The operator may change the calling level (useful for "grabbing" more lines), or the number of call retries to be made in reaching the callees. If everything is as satisfactory, the operator simply depresses the F1 key to process the calling session. At this point, passwords may be required. If so, the pop-up screen illustrated in FIG. 31 is displayed. As in the password screen of FIG. 3, the operator simply enters the password and depresses the ENTER key to continue. No calls will be initiated unless the proper password is entered.

FIG. 32 shows a screen indicating the total number of calls queued, as well as the designated number of the particular calling session. The number of the particular calling session is used to identify the calling session for all future operations. Thus, the operator should note the number. At this point, the database system is in the act of calling the callees selected by Numbered Lists and/or Geo Zones.

When instructed to call the callees in the Geo Zone, the software of one embodiment copies information from database 57 to temporary file 58. File 58 contains essential information regarding each call, as shown in the record layouts in the appendix. Accordingly, information such as whether an attempt to call the callee has been made, the date and time of each attempted call, and any keystroke responses to questions may be recorded in temporary file 58.

It is possible for the operator to ascertain the progress of a particular calling session. To do so requires either going to the start call-stop call menu or using the calling log as described herein. Recall that at the Main Menu shown in FIG. 2, an option provided to the operator under the Geo/List Calling menu is Stop Calls. This option is selected by simply highlighting the Stop Calls line (see FIG. 33) and pressing the ENTER key. Upon selection of the Stop Calls function, the screen illustrated in FIG. 34 is shown. Information is provided to allow the operator to select a particular calling session to complete or to cancel. This feature may be useful, for example, whenever a situation or crisis has resolved itself before all callees have been called. The information displayed in FIG. 34 is also useful for viewing the summary level progress of a particular calling session. The total number of calls, the number of completed calls, and the percentage of completion for a given calling session is displayed in FIG. 34. The arrow keys as well as the PGUP and PGDN may be used to display the desired calling session and to check its progress. To complete a finished calling session, i.e., a session which is 100% completed as indicated on the screen, depress the F1 key. Depression of the F1 key updates the reporting files and marks the session as called.

To cancel a calling session in progress, the operator also depresses the F1 key. Depression of the F1 key in this instance first completes all calls that are immediately being made, not calls that are yet to be made. This assures that callees with whom connection may have been made will not be disconnected. Secondly, it cancels all calls that have not yet been made and marks the session as called. In the example that follows, calling session number 17 was selected with the F1 key. The intention here is to cancel the session before it is queued into the system. Note that calling session number 17 is second to the completion of session 16.

After depressing the F1 key in FIG. 34, the screen shown in FIG. 35 is displayed. This screen shows the status after the calling session has been canceled. Note that the total number of calls, the total number of calls completed, and the percentage of completion are displayed. After this screen has been viewed by the operator, depression of the ENTER key returns the operator to a screen similar to that shown in FIG. 34, namely, the screen of FIG. 36 is displayed. Because calling session 17 has been canceled, it is no longer displayed in the list of calling sessions.

In the Main Menu, a third option under the Geo/List Calling Main Menu item is Calling Log (see FIG. 37). Calling Log allows the user to either display or to print a report of the log called during a specific calling session. The option can be used both when a calling session is in progress as well as after it has been completed. The data used for reporting is generally not completely up-to date until the session has been both completed and stopped. It may take some period of time from the completion of the last call to bring the data up-to-date.

If the Calling Log function of the Geo/List Calling Main Menu item is selected, the screen illustrated in FIG. 38 is displayed. The prompt screen of FIG. 38 allows the user to select a particular session to display or print. Note that the calling session number, the date, and the time are all displayed for the operators convenience. The last session will be the default session to be displayed. To see a list of sessions from which to select, the operator should depress the F1 key. Depression of the F1 key displays the screen shown in Fig. This screen shows the calling session selection list. Certain descriptive information is displayed to help the operator select a calling session to display or print. The arrow, PGUP and PGDN keys may be used to move within the list of calling sessions. If the operator desires not to select a calling session, the ESC key may be depressed. The ability to list calling sessions may be helpful when the operator only wants to review the descriptive information for a particular calling session. To select a calling session for reporting, the F1 key is depressed. In the example screen of FIG. 39, calling session number 6 is chosen. Upon depression of the F1 key in FIG. 39 with session number 6 chosen, the screen of FIG. 38 is updated to be the screen of FIG. 40 showing session number 6 as the calling session to be displayed or printed. To display the report results, the operator depresses the F2 key. To print the report, the F4 key should be depressed.

Upon depression of the F2 key to display the report of session 6, the screen in FIG. 41 is displayed. The calling log provides the operator with detailed information for each call of a particular calling session. This report provides feedback of how successful the calling session was or is. If callees did not receive the message, or if they did not give the required response, it will be clearly visible on the screen display of FIG. 41. At that point, the operator may choose to validate a particular callee's telephone number, or contact them personally. As in the displays of many of the lists presented throughout the software system, the PGDN and PGUP keys may be used to display different pages of the report.

When the operator has completed reviewing the report, depression of the ESC key returns to the previous screen, i.e. the screen of FIG. 40. If while viewing the screen of FIG. 40 the operator depresses the F4 key to print the results, a pop-up window as illustrated in FIG. 42 is provided to the operator. In the log print-out, the operator has a few options, namely, whether to provide Geo Zone and List detail; whether to include all calls, delivered calls, or non-delivered calls; and whether to include the specific responses received from the callees. Once the appropriate information has been entered, the ESC key allows the operator to exit without printing the report, while depression of the F2 key prints the report for the calling session selected. While printing, a prompt will be shown showing that printing is in progress, as illustrated in FIG. 43.

Selection of Geographical Zones

It will be appreciated by those of skill in the art that selection of the Geographical Zones according to the embodiment set forth in the foregoing description may be based on a variety of criteria. In the embodiment presented in FIG. 1, X and Y coordinates are provided in database 57 for each telephone number and the X and Y coordinates are unique for each telephone number located at a different address. As a result, there is no limitation to the size of the geographical area to be contacted by the system of the present invention. The geographical area may range from the very small to the very large.

In the embodiment described above, each Geo Zone is defined by identifying two opposing corners of a rectangular area. For each telephone number to have unique X, Y coordinates necessitates that a very small grid (resolution) be employed. Therefore, it is impractical to select the area by listing blocks of geographical areas. The selection of opposing corners eliminates the need to list a series of blocks as is done in the prior art and also permits the selection of very small geographical areas not accessible within prior art systems.

A number of means may be used to assist the user in determining the boundaries of the geographical zone to which calls are to be initiated. For example, a hard copy map may be provided, or a computer based mapping system may be used. Regardless of the means, for automated phone calling systems of the present invention whose messages must be transmitted in a time critical manner, the means should be conducive to quick determination of the geographical boundaries.

Updating the System's Database

Returning now to FIG. 1, the general operation of the automated phone calling system of the present invention is discussed herein with particular emphasis on ability to allow callees to respond to inquiries that will affect their reception of future calls by the system. As described above, the operator sets up the calling session through user input and display 51. In one embodiment, temporary information is stored in temporary file 58 upon completion of the set up operation and initiation of a call session. Temporary file 58 contains the data records for callees selected for a call session. In this manner, the necessary fields from each selected record of database 57 are copied to temporary file 58 so that database 57 is not corrupted in the event of an unforeseen event, such as a power outage. Further, though automatic updating of database 57 is possible with the automated phone calling system of the present invention, there may be instances in which it is desirable to require that the responses of the callees be viewed by an operator prior to permanently updating the contents of database 57.

It will be appreciated that it is plausible to provide an automated phone calling system according to the present invention which does not use temporary file 58. However, as previously stated, use of temporary file 58 may be advantageous in reducing the possibility that database 57 becomes corrupted and may also be used as a buffer for verifying the responses of a callee prior to permanently changing database 57.

Returning to the operation of the system of the present invention, hardware/software interface 50 initiates calls to each of the callees over telecommunications interfaces 53–56. Calls are queued according to and depending upon the number of callees to be contacted and the number of telecommunications lines provided by telecommunications interfaces 53–56. For each call initiated, hardware/software interface 50 monitors the telecommunications line for connection with the callee and for receipt of a voice signal which hardware/software interface 50 assumes to indicate that a person has answered the telephone call it initiated. At this point, the message to be provided the callee is retrieved and transmitted over the appropriate telecommunications interface 53–56.

If the message is not one which requires input from the callee, hardware/software interface monitors the appropriate telecommunications line to ascertain whether the complete message was provided to the callee. In this manner, should it be desired that the callee be recalled in the event of an interruption of communication, hardware/software interface 50 may store a store/no store flag for use in retrying to provide the message to that callee.

If the message transmitted anticipates that the callee will provide a TOUCH TONE response to an inquiry made of the callee, hardware/software interface 50 monitors the telecommunications line for a response and records the TOUCH TONE response made. Other callee responses are also possible, such as rotary pulse codes or vocal responses, as described below, and hardware/software interface 50 may be configured to monitor the telecommunications line for any of these responses. If appropriate, hardware/software interface 50 modifies the appropriate data field of temporary file 58 for later permanent modification in database 57. Alternatively, hardware/software interface 50 may directly modify the appropriate data field in database 57. If temporary file 58 is used to record the modification of a data field, database 57 may be automatically updated upon completion of the call, automatically updated upon completion of the call session, or updated upon approval of the operator, for example.

If additional inquiries are to be made of the callee by the system, hardware/software interface 50 continues with the recorded message(s) to be provided to the callee. Once all messages and responses to inquiries are received, hardware/software interface 50 provides a sign-off message, such as, "Thank you for your time," and disconnects telecommunications with that callee.

It will be appreciated by those of skill in the art that other telecommunications features may be incorporated into the automated phone calling system of the present invention. For example, the system may be instructed to retry communication with a callee who did not answer within a specified number of rings. Further, a time increment may be established for retrying to contact that callee. It is also possible that the queuing of calls over telecommunications interfaces 53–56 may be prioritized.

It will also be appreciated that numerous data fields may be stored in database 57 to accommodate the provision of messages. As described above wherein the priority of the Numbered List(s) and/or Geo Zone(s) to be called may be prioritized, each record of database 57 may also include a data field which indicates individual priorities for callees. For example, perhaps all hospitals, schools, and other institutions are to be contacted first in the event of a emergency, such as a chemical spill, in the area. Various telecommunications features and optional database fields are contemplated to be within the scope of the invention.

Future calls made by the automated phone calling system of the present invention will therefore be impacted by the information stored in database 57. Depending on the particular application of the system, this feature may be critical to the success of the system. Individuals and businesses alike are often the recipient of unwanted calls such as unwanted telephone solicitation which occurs at all hours of the day and night. The provision of "control" by the callee may therefore be particularly advantageous when the system is not employed in what might be termed a vital public-serving function—one which the public would generally agree requires that all callees should and must be notified, as in the presence of a tornado, for example.

Several types of data fields may be used to impact future calls received by a callee. As mentioned above, one or more data fields in database 57 may be used to designate appropriate calling times for each callee. In addition, if the automated phone calling system of the present invention is to be used to provide a plurality of message types to callees, a data field may be utilized to indicate whether the callee is to receive a particular message. For example, if the system of the present invention is employed by a law enforcement agency to alert its public about suspected or actual crime in the callee's geographical area, certain callees may only be interested in receiving certain types of messages. For example, a callee having young children may wish to be apprised of a pattern of stolen children's bicycles whereas an older individual or a callee having no children may not wish to be notified of such information. The interactive capability of the automated phone calling system of the present invention gives the callee control over the receipt of such calls.

Upon installation of the system, it may be desirable to communicate with all potential callees to allow each callee to configure the system for that callee for all future calls. Such configuration may include calling times, the invocation of a password so that the callee is certain that a particular individuals or set of individuals receive messages from the system (a callee may desire such a feature to prevent messages from being heard or intercepted by children, for example), or limiting the types of messages the callee will receive.

A calling session to multiple callees may be interrupted by the operator or may terminate when a sufficient number of attempts to each callee has been made. In either case, temporary file 58 may include fields containing TOUCH TONE keypad responses of callees to whom calls were successfully placed. This information may be used to update criteria for callees in the database. In particular, when the Change Criteria option is selected from the Geo/List menu of FIG. 2, the Change Criteria as a result of a Calling Session screen of FIG. 44 is displayed. In this embodiment, one of different touch tone responses may have been depressed by callees. The user may, for each response, tab to the # column and enter one of the callee database criteria (one of 39 in one embodiment). The system will display the criteria description associated with the criteria in the Description column, as shown in FIG. 45. The operator may then tab to the New Value column and specify a New Value for the criteria if the callee depressed the specified response key. For example, in FIG. 45, the operator has specified that if response 1 was depressed, that criteria 3 (neighborhood watch) should be changed to a "*", and if response 3 was depressed, that criteria 1 (business) should be changed to "S."

After the calling session on which the updates will be based has been selected, F1 may be depressed to allow the operator to enter the responses. (This may be necessary, for example, because different calling sessions may be implemented with the system.) The desired calling session is selected by depressing the F1 key as shown in FIG. 46. The system will then return to the prior screen, FIG. 45, whereupon the operator may depress the F2 key to save the changes. Because updating the criteria will result in permanent changes to database 57, a warning message is displayed as shown in FIG. 47 giving the operator an opportunity to reconsider. By pressing enter, the system updates database 57 by replacing the specified criteria fields with the indicated values. As shown in FIG. 48, during this process, the screen may display a running count of the number of records read from the temporary file and the number of database records updated by the system. Using the procedures described above in the discussion of FIG. 27, the updated criteria may then be used to select callees for future automated calls.

Databased Entry by Callee to Establish Geo Zone

As previously stated, Geo Zones may be established by several criteria, including telephone exchange numbers, city of residence and street address. In another embodiment of the invention, nine-digit zip codes may be used to define Geo Zones. In this embodiment, each phone number is associated with a zip code. Defining Geo Zones by nine-digit zip codes is the preferred embodiment of the invention when geographical information about particular phone numbers is difficult to obtain. Geographical information about a phone number may be unavailable, for example, if a database of phone numbers is purchased from a phone company, but several persons associated with the phone numbers have requested that their address be unpublished. In such instances, it may be necessary to contact individuals to request a zip code when a phone number exists in the database, but no longitude/latitude or zip code has been entered into the database, and thus no Geo Zone has been assigned to the callee. In this situation, the present invention may be used to contact individuals whose phone numbers are stored within the database but for which there is no associated Geo Zone, to request a nine-digit zip code from the individuals so that the individuals will be notified when events occur in their respective Geo Zones.

When the system uses zip codes to define Geo Zones, it is desirable for the system to periodically contact all callees having phone numbers stored in the database to obtain a zip code, or to confirm that each callee continues to have the same zip code stored in the database. Periodic zip code confirmation is desirable for effective operation of the system because certain callee zip codes are likely to change without the phone number changing. This situation will occur when a callee moves to a new residence outside of his or her old zip code location, but retains his or her old phone number for use at the new residence. By periodic updating of zip code information, the system will limit the number of instances where callees residing in a first Geo Zone are incorrectly contacted with notifications concerning a second Geo Zone.

Figure 54B:
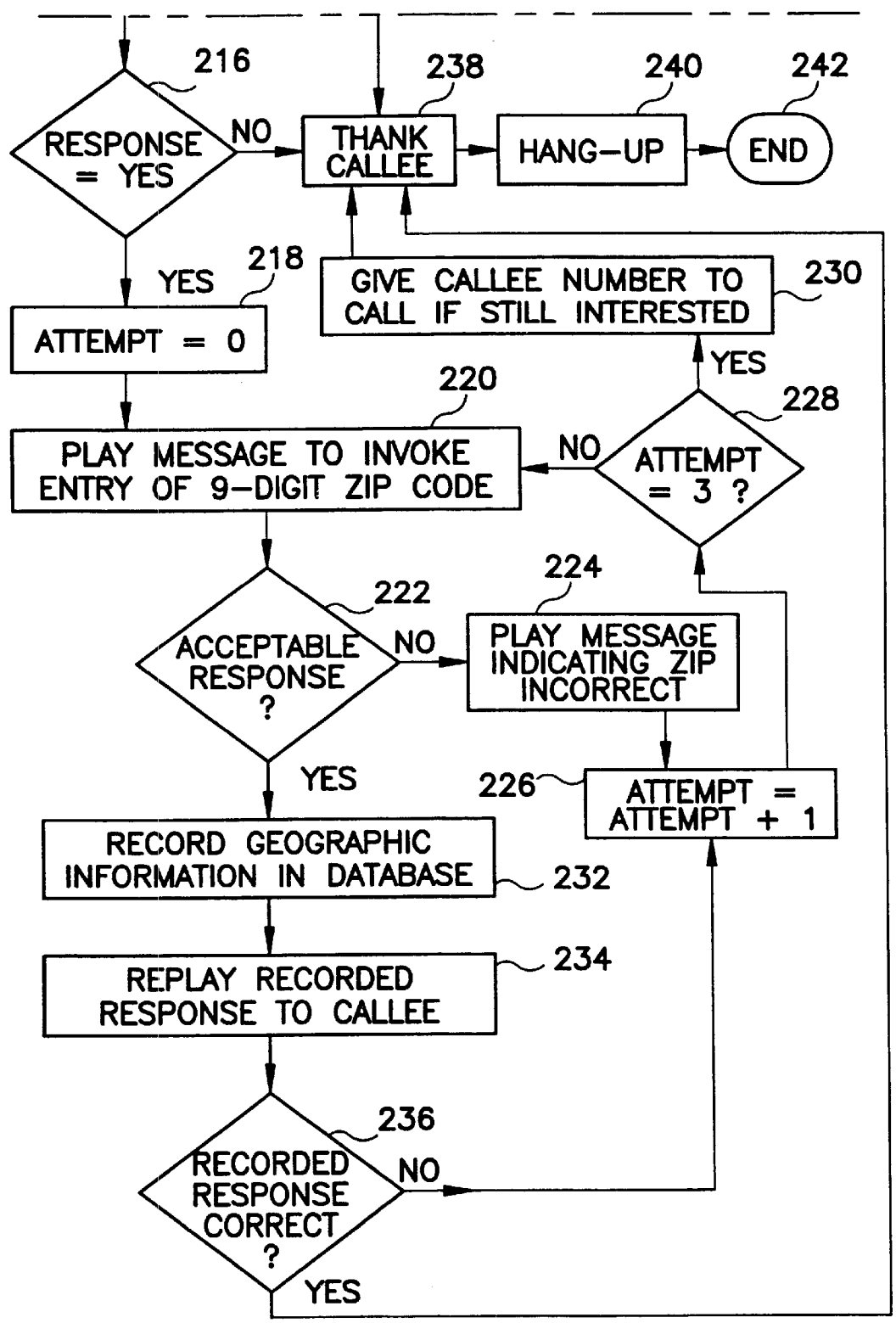
FIG. 54 shows a block diagram of one embodiment of the method of the present invention wherein callees are asked to input a zip code for entry into the database.

Referring to FIG. 54, a flow chart is shown of one embodiment of the present invention wherein zip codes are used as Geo Zones and callees are asked to input zip codes into the database. Beginning with step 200, the system has identified a number of callees having phone numbers entered into the database, but having no zip code information in the database. The system may determine that particular phone numbers have no associated zip code information by the absence of information in the zip code field or by a flag or other identifier which signifies that zip code information is needed. Following identification of the callees, a particular callee is selected in step 202 to be contacted by the system for zip code information. The system makes a call to the callee in step 204 and waits for an answer from the callee in step 206. If there is no answer by the callee, the "retry" algorithm represented in step 208 is executed prior to retrying to initiate a call to the non-answering callee.

If an answer is detected in step 206, the system next determines in step 210 whether an answering machine or answering service has answered the call. If an answering machine or service has answered the call, a message is left on the machine in step 212 requesting the callee to call back with zip code information if the callee is interested in receiving notification calls according to the present invention. Alternatively, if an individual has answered, a message is left for the callee in step 214 asking if the callee is interested in the service.

Step 216 receives a response from the callee concerning the callee's interest in the service. If the callee is not interested in the service, the callee is thanked in step 238, and the call is ended. If the callee is interested in the service, an attempt register is set to zero in step 218 and a message is played as shown in step 220, requesting the callee to input a five or nine-digit zip code. Next, the system determines in step 222 if the zip code entered was an acceptable zip code (i.e., an actual zip code used by the system). If the zip code entered is not an acceptable zip code, the attempt register is incremented in step 226.

In step 228, the system determines if the callee has reached the attempt limit. For example, if the callee has entered three incorrect zip codes, the callee will be given a message in step 230 telling the callee that none of the entered zip codes were correct zip codes. The message of step 230 will also give the callee a phone number and ask the callee to call the number when a correct zip code is obtained. In this manner, callees who do not know their complete nine-digit zip code at the time of receiving the call may call the system back with a correct zip code and still be included in future notification messages sent by the system to the callee's particular Geo Zone.

Upon receiving an acceptable zip code in step 222, the system proceeds to step 232 and records the callee's zip code (or other derived geographic information) in the database. In one embodiment, all zip codes recorded in the database are associated with a callee phone number. Alternately, the system may access a database associating zip codes with longitude/latitude information (on another form for representing geographic information), and use such longitude/latitude information to indicate a Geo Zone. In this manner, a group of callees may be selected based upon their zip code for receiving calls with important notices for the particular Geo Zone.

As shown in steps 234 and 236, the system may request confirmation from the callee that the zip code entered by the callee is the correct zip code. If the callee indicates that the recorded zip code for the callee is not correct, the attempt register will be incremented and the callee will be prompted to enter a new nine-digit zip code. Upon confirmation in step 236 that the recorded zip code is correct, the system will thank the callee for entry of the zip code. Thereafter, the system will hang up the phone in step 240 and end the session in step 242.

As discussed previously, if multiple incorrect zip codes are entered by the callee, the callee will be requested to make a return call to the system and enter a correct zip code. Initiation of such a call is displayed in steps 244–248. In step 244, the callee has placed a return call to the system, and the system answers the call in step 246. After the system identifies the callee and associates the callee with the callee's number in the database, the callee is given the message of step 214 wherein the callee is introduced to the system and the callee is asked if he is interested in the system. As discussed previously, the system will then take the callee through various steps wherein the callee may enter a zip code to associate his or her phone number with a Geo/Zone.

Another situation where nine-digit zip codes are useful in defining Geo Zones is where no phone numbers are held for individuals within a particular area. In this situation, all that is known about the individuals is that they live in an area having a certain telephone area code and exchange. For example, individuals in a particular portion of a city may all have telephone numbers with the same area code (e.g., 317) and exchange number (e.g., 781-). In this situation, the present invention may be used to contact all individuals having the specified area code and exchange to request their zip code, and thus define a Geo Zone. This is accomplished by the system's sequential calling feature.

The system's sequential calling feature allows the operator of the system to request that the system place phone calls to all phone numbers having a particular telephone area code and exchange. After the operator makes such a request, the system generates a call list of telephone numbers having designated area code (e.g., 317) and exchange (e.g., 781). This results in a callee list of ten thousand phone numbers, all with the same area code and exchange, with the final four numbers ranging from 0000 to 9999. The call list is generated by the system and stored in a temporary file for use by the system during the actual calling session. Of course, many of the telephone numbers on the call list will not be in service. For these numbers, no information is recorded in the database, or information will be recorded indicating that the number is not in service. For all callees contacted by the system, information is recorded in the database about the individual associated with the number (e.g., zip code, does not wish to participate, etc.).

Referring again to FIG. 54, the operator has entered an area code and exchange area for the system to generate numbers for and attempt to contact the individuals associated with the numbers. The system generates a callee list of ten thousand numbers and begins calling the numbers in step 200. First, the system selects the first number in the call list in step 202 (e.g., 317-781-0000) and attempts to contact a residence at that number in step 204. If no callee is contacted or if the system receives a faulty number message from the phone company (e.g., number no longer in service, number disconnected, etc.) the system increments to the next number on the call list in step 208 and attempts to contact the next callee. If the phone is answered by a message service or answering machine in step 210, the system requests a call back in step 212 from the callee if the callee is interested in the service. If a call to a number actually results in contact with an individual, the system goes through the same steps as described above, requesting the callee to enter their nine digit zip code if they are interested in receiving the service. At the close of the call, after the callee has entered a proper nine digit zip code, both the callee's telephone number and associated zip code are permanently entered into the database in step 232. After the system has placed calls to all numbers on the the call list, it is anticipated that many new phone numbers and zip codes will be permanently stored in the database.

A new call list for the same telephone area code and exchange number may be generated at a later time in an attempt to contact individuals who were not contacted during the initial calling session. When generating the new calling list to establish Geo Zone information, the system is capable of excluding numbers from the calling list for which Geo Zone information has already been received. Therefore, duplicate calls are not made to individuals that have already entered their zip code into the system. In this manner, a database of telephone numbers and associated Geo Zones may be built from scratch with the sequential calling feature of the system.

Many phone companies will allow individuals to keep their same phone number when they move from one residence to the another, as long as the new residence is within an area where the individual may use the same area code and exchange numbers. However, a change in residence will likely result in a change in zip code. Therefore, the system provides the additional feature of Geo Zone updating. With Geo Zone updating, the system is programmed to periodically call all callees having a given zip code stored in the zip code data field within a database and confirm their zip codes. When the system establishes contact with a callee in an attempt to update zip codes, the system tells the callee the zip code presently stored in the system for the callee's phone number. The callee may then indicate whether the zip code is correct or incorrect for the callee's present address. If the stored zip code is incorrect, a new zip code may be entered by the callee. In this manner, the system performs a periodic self-check to make sure that all system phone numbers include the proper zip code, and thus the proper Geo Zone. This prevents a callee from receiving a false alarm when his or her zip code has changed and the system is attempting to contact callees with information concerning the old Geo Zone.

Public Notification of Sex-Offender Information

As previously stated, sex-offenders, and perhaps other criminals, such as convicted felons, are required to register their residence with a law enforcement agency and/or government authority. The system presented in FIG. 1 and described hereinabove can be used to notify interested persons of offenders residing within a geographical area of interest to that person.

Figure 51B:
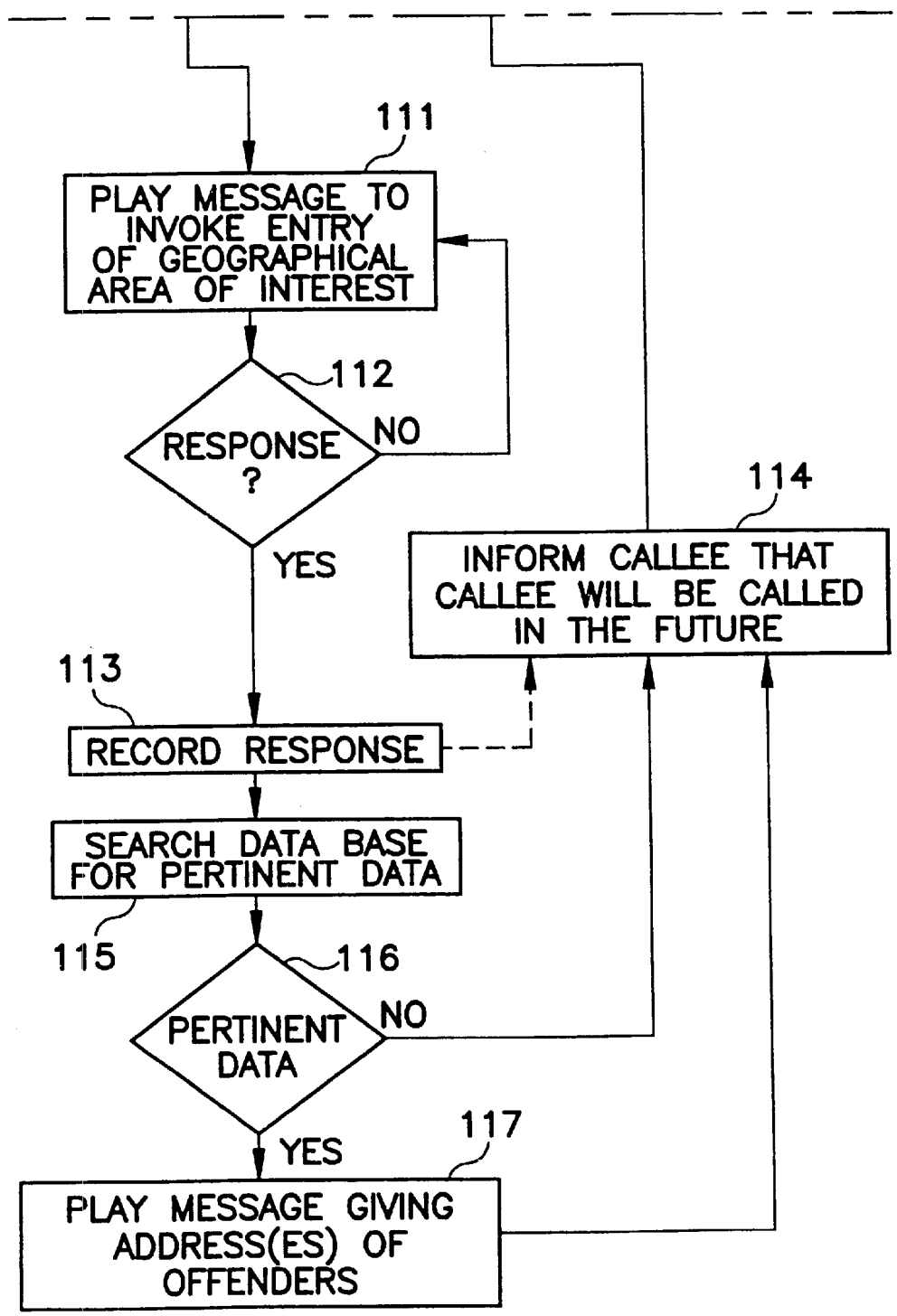
FIG. 51 shows a block diagram of one embodiment of the method of the present invention used to inform callees of pertinent data regarding sex-offenders.
Figure 52A:
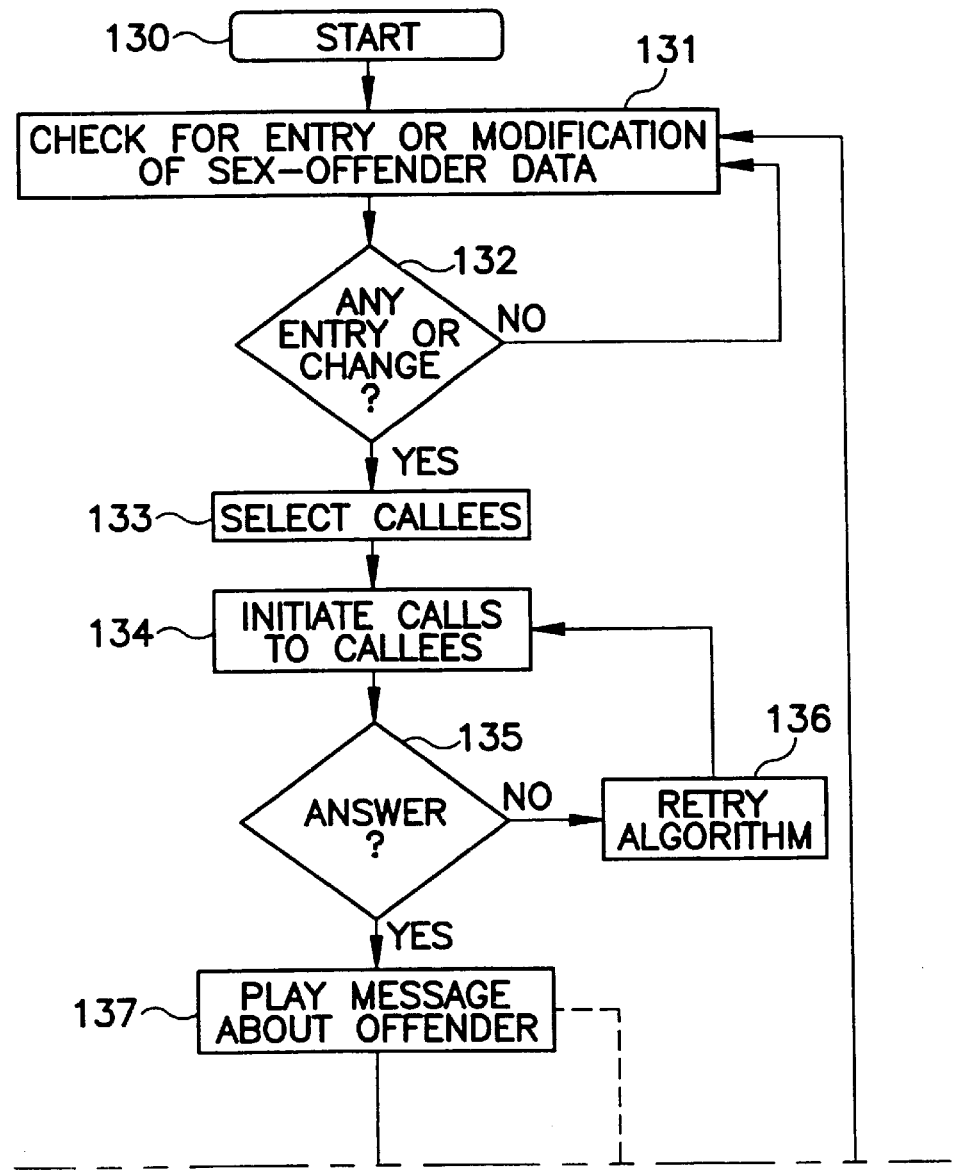
FIG. 52 shows a block diagram of a second embodiment of the method of the present invention for notifying callees of pertinent data regarding sex-offenders.
Figure 52B:
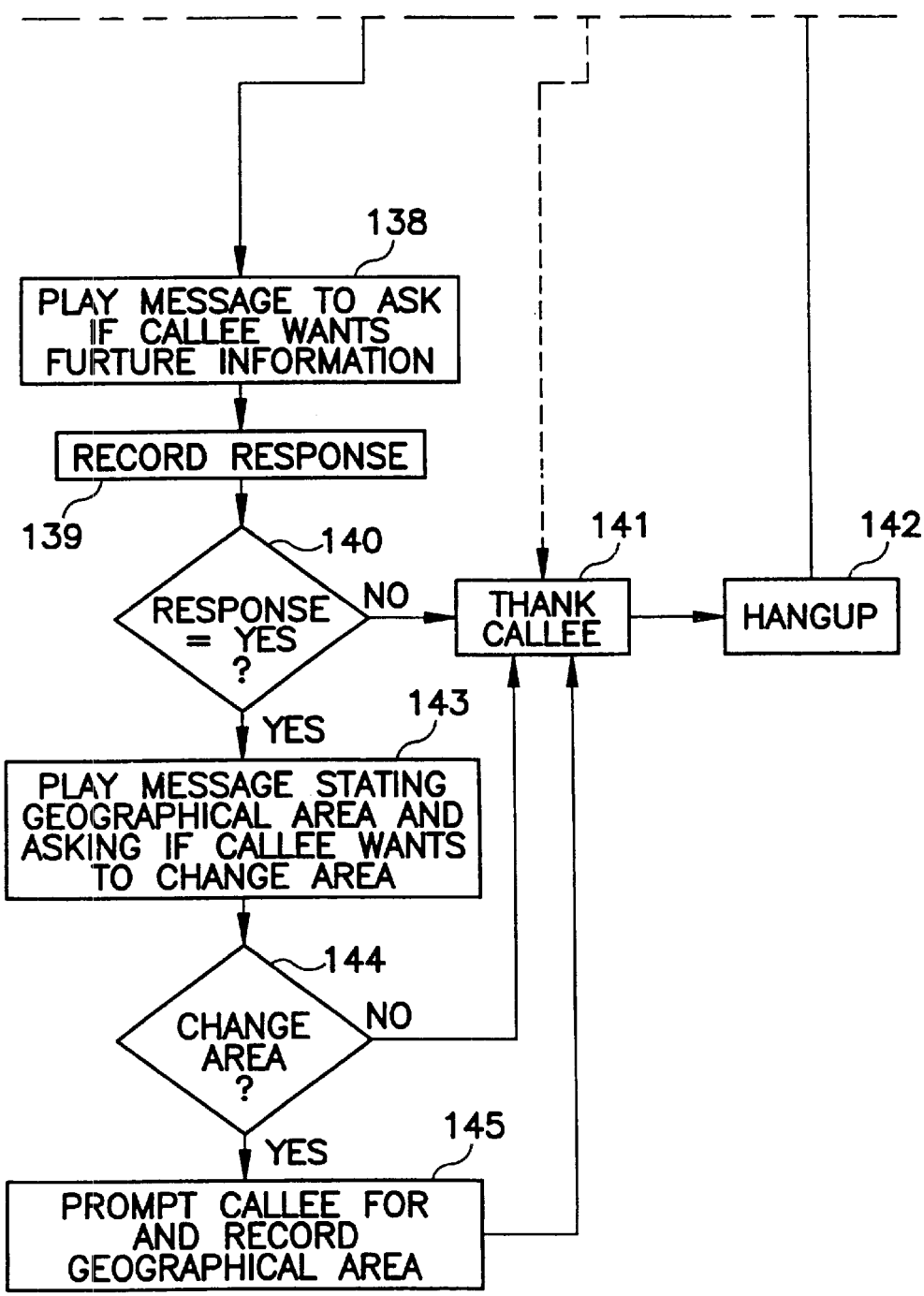

FIGS. 51 and 52 show flow charts of embodiments of the method of public notification according to the present invention. As is explained in greater detail herein various alternative methods may be used to initiate and/or modify the data field(s) associated with the receipt of sex-offender (or any registered criminal) information from the system.

Referring now to FIG. 51, in the method beginning with step 100, the system has initiated the data field(s) for all callees. Such initiation may be desirable after installation of the system into a new area. For example, the system may indicate all callees input into the system are to be initially called to ascertain each callee's interest in receiving sex-offender information.

Based on the selection criteria as discussed hereinabove (which may include a selection based on data originally supplied by a callee), including but not limited to a Geo Zone, callees are selected in step 101 for notification. The system then initiates calls to each of the callees in step 102. For each callee, the system determines whether or not the callee answers in step 103. If there is no answer, the "retry" algorithm represented in step 104 is executed prior to retrying to initiate a call to the non-answering callee.

If an answer is detected in step 103, a pre-recorded message (recorded and selected as described hereinabove) is played in step 105 asking the callee if the callee is interested in receiving sex-offender information. The response of the callee (such as by key pad depression) is recorded in the database 57 (or temporary file 58) for the record of the callee in step 106.

If the callee's response as determined in step 107 is equivalent to "No", indicating that the callee does not wish to receive such information, the system plays a pre-recorded sign-off "Thank you" message in step 108, hangs up its connection with the callee in step 109, and ends at step 110. Of course, it will be appreciated that end step 110 is the end of interaction with only that particular callee. The system concurrently and successively continues to initiate calls to other callees in the selected list in step 102 until the list of selected callees is complete.

If it is determined in step 107 that the callee wishes to receive information regarding sex offenders, a message is played to the callee in step 111 to ask the callee to input the callee's geographical area of interest. The message played in step 111 may also inform the callee of the already established area in that callee's database record.

The selection of geographic area may be based on numerous criteria as discussed herein, and may also be based on a radius—such as a radius of X blocks or Y miles about the callee's residence, and such radius may be designated by appropriate key pad entries. Alternatively, the area selected could be about a point other than the callee's residence, such as a school attended by the callee's children. This could be designated, for example, by entering the school's zip code via the key pad, or, by dividing a geographic area into zones, e.g., enter 1 for downtown, 2 for northwest side of town, 3 for north side of town, etc. Also, it is conceivable that more than one geographical area of interest could be established for the callee. For each of these various options, the message played in step 111 is tailored to the system options made available and as represented by the number and type of data fields made available for each callee.

In step 112, the system awaits a response from the callee. Once a response (or responses) are received, the response(s) is(are) recorded in database 57 (or temporary file 58) in step 113. These responses may be recorded via a data field which may be subsequently used to select a subset of callees for a later call.

At this point, if the system is only being used to acquire responses from callees (such as before any sex-offender information is available in the system), the system proceeds to step 114 to play a message to the callee informing the callee that the callee will be called in the event that information is available about a sex-offender ill the selected geographical area. Then, a sign-off message is played in step 108 and the connection to the callee is terminated in step 109.

Figure 53:
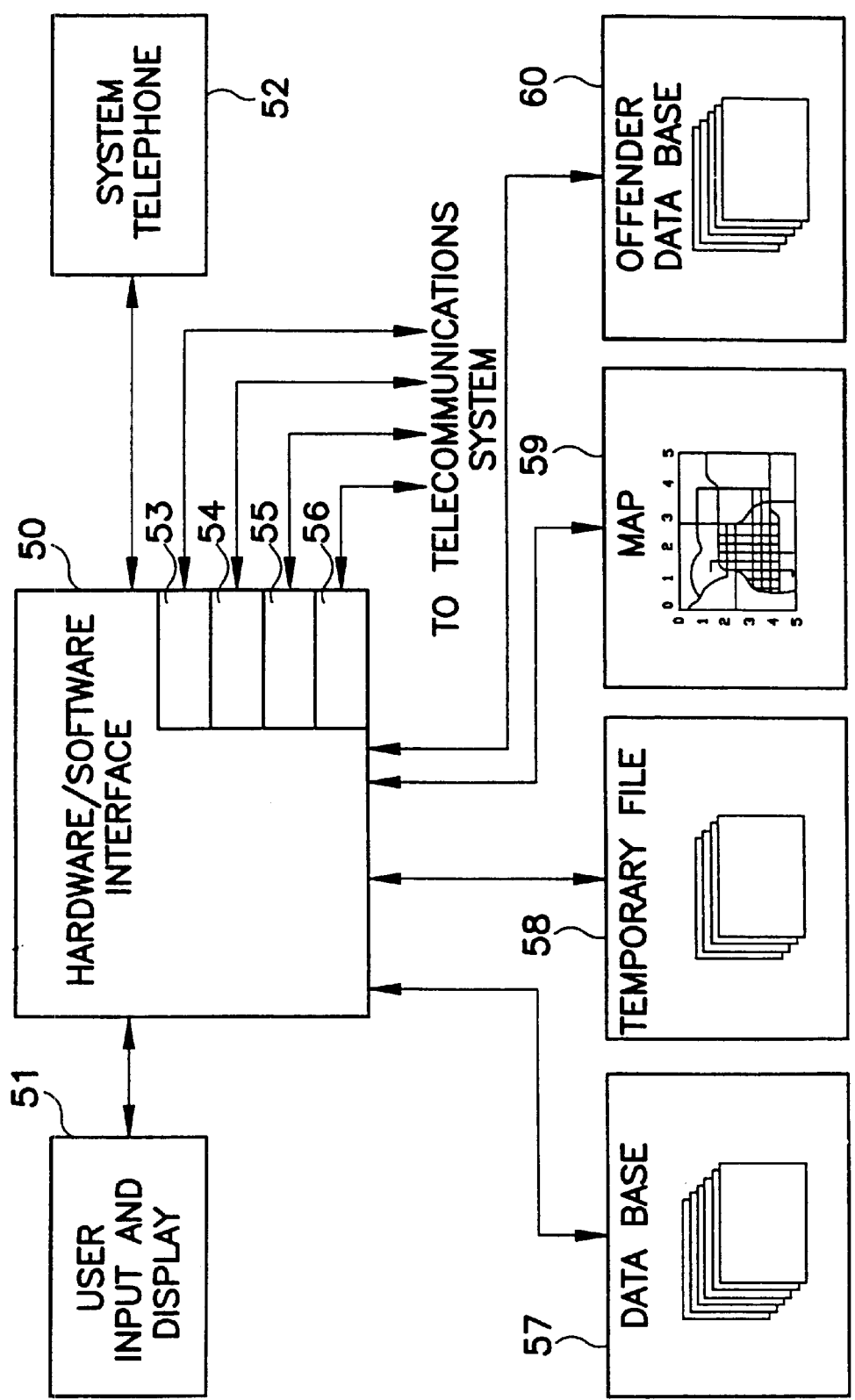
FIG. 53 shows a block diagram of one embodiment of the public notification system of the present invention containing information about sex-offenders.

If the system contains information about sex-offenders, the system proceeds to step 115 to search sex-offender database 60 (see FIG. 53) for pertinent data, i.e., information about offenders residing in, moving into, and/or moving out of the selected geographical area. As shown in FIG. 53, offender database 60 is bi-directionally connected to hardware/software interface 50 to permit hardware/software interface 50 to retrieve offender information. In addition, offender information may be entered into the system by user input and display 51 working with hardware/software interface 50, or by other means well known in the art.

Returning now to FIG. 51, after hardware/software interface 50 searches for pertinent offender data in offender database 60, if pertinent data is found in step 116, the system plays one or more messages conveying that information to the callee in step 117. The message may comprise either a pre-recorded voice message pertaining to the particular offender, or, may comprise an automated text-to-voice translation of digitized words from a database. If no pertinent data is found in step 116, the callee is informed about future messages in step 114. Likewise, if pertinent data is found in step 116 and conveyed to the callee in step 117, the callee is informed about future calls in step 114.

In an alternate embodiment of the public notification system according to the present invention, a person may call into the system rather than, or in addition to, the system making the call to the callee. This alternative method is illustrated in steps 118, 119, and 120 of FIG. 51. In step 118, a person dials the system. In step 119, the system recognizes the receipt of a call. Then, in step 120, the callee is either identified (such as by caller-id, for example) or asked to register if the callee cannot be automatically identified. The callee's phone number will in step 120 be compared to those in database 57. If the callee's phone number is not found in database 57, a dialog would need to ensue to acquire the necessary information about the callee to establish a database record for the callee. Then, beginning with step 105, the system can continue to allow the callee to establish the calling parameters for that callee for present and future calls with information about sex-offenders.

It will be appreciated by those of skill in the art that some system installations may not need to consider a preferred geographical area with respect to sex-offender information. For example, in small rural communities, it may be reasonable to assume that all callees interested in receiving sex offender information want the information for the entire geographical area of the town. Under such circumstances, steps 111, 112, 113, 115 and 116 would not need to be executed.

Referring now to FIG. 52, there is shown a second embodiment of the method of public notification for sex-offender information. In this embodiment, sex-offender data already resides in offender database 60. Step 130 may be the initial start up of the system in which default parameters for sex-offender information have been established for all callees in database 57, or may be executed after the parameters are initialized or modified in accordance with the method of FIG. 51.

In step 131, the system checks for the entry or modification of data in offender database 60. Such determination may be under the control of hardware/software interface 50 if hardware/software interface is used for entry or modification, may be examined by hardware/software interface 50 if entry and modification is achieved without involvement of hardware/software interface 50, or may be manually invoked by an operator using user input and display 51.

In step 132, if the system determines that an entry or modification has been made to sex offender database 60, callees are selected in step 133. The selection of callees in step 133 is based on the parameters for each callee, such as a flag for whether such information is to be received at all, and/or geographic area. The system initiates calls to the selected callees in step 134. If no answer is detected from a particular callee in step 135, the system executes its retry algorithm in step 136. If the callee answers, a message relevant to the entry or modification detected in step 132 is played to the callee in step 137.

Once the pre-recorded message of step 137 is played, the system may simply thank the callee in step 141, hang up in step 142, and continue monitoring for additional entries or modifications to offender database 60. Alternatively, the callee may be given the option to control future calls received from the system with regard to offender information.

In step 138, the system plays a message to inquire whether the callee wishes to receive such calls. The prompted response of the callee is recorded in step 139. If the recorded response is "No", a sign-off message is played in step 141 and the connection to the callee is disconnected in step 142. If the callee wants to receive such calls, in step 143 the system inquires as to whether the callee wishes to maintain the same geographical area. If it is determined in step 144 that a new geographical area is desired, the system prompts the callee and records responses to change the geographical area in step 145.

As was true with regard to the method of FIG. 51, geographical area may not be an appropriate parameter for all instances. Also, other criteria associated with the callee, such as time of day may be used. Further, it is possible that a callee may wish to password protect messages regarding sex-offenders to preclude children from receiving such information directly.

It will also be appreciated that steps 102 through 117 of FIG. 51, and'steps 134 through 145 of FIG. 52 are executed for each of the callees selected in step 101 (FIG. 51) or step 133 (FIG. 52). For illustrative purposes, the concurrent and subsequent calling of all selected callees is not shown in FIGS. 51 and 52.

It will be appreciated by those of skill in the art that a system that does not require operator intervention to update a database criteria field based on a user's TOUCH TONE keypad response is also within the scope and spirit of the invention. Further, the system may be designed to record multiple TOUCH TONE keypad responses of a callee and record them in the temporary file for updated multiple callee criteria in the database. The term "dial code" as used herein and in the claims is intended to refer to both TOUCH TONE (DTMF, or dual tone multiple frequency) and rotary pulse codes, as well as vocal responses interpreted by voice recognition or equivalent systems, such as systems that understand simple spoken words, such as "yes," "no," and the numbers zero through nine, and translate such spoken words into data values usable by the invention. Of course, those of skill in the art may utilize any number of software environments to implement the invention, including WINDOWS 95(R).

Vocal Response by Callee

Voice responses provided by a callee in response to inquiries made by the system are accepted by telecommunications interfaces 53–56. Hardware/software interface 50 prompts the callee for entry of a dial code voice response from a set of allowable vocal responses, and records the response entered by a callee. A voice recognition system within hardware/software interface 50 translates the recorded response into a binary code, or data value, representative of the callee's allowable response. If the voice recognition system does not recognize an allowable vocal response, the system prompts the callee again for entry of an allowable response. After an allowable response is recognized and translated, hardware/software interface 50 updates at least one data field in database 57 for the callee, or at least one data field in temporary file 58, based on the binary translation of the callee's allowable vocal response. For example, in FIG. 45, the operator has specified that if response "one" was spoken, that criteria 3 (neighborhood watch) should be changed to a "*", and if response "three" was spoken, that criteria 1 (business) should be changed to "S". Alternatively, the system may be set up to accept additional word responses. For example, the operator may specify that if the response "neighborhood watch" is spoken, criteria 3 (neighborhood watch) should be changed to an "*", and if the response "business" is spoken, criteria 1 (business) should be changed to "S".

The voice recognition system may be implemented within the hardware/software interface 50 using either software alone or a combination of hardware and software. For example, a software voice recognition system is available from ARTISOFT® entitled VISUAL VOICE. VISUAL VOICE is capable of recognizing spoken words and phrases in a software assisted mode or a hardware assisted mode. In the software assisted mode, voice messages are processed and translated into data values by a voice recognition engine such as WATSON by AT&T. In the hardware assisted mode, processing of the voice message is accomplished by off loading the voice recognition processing on a separate processor board, such as the DIALOGIC ANTARES board. Such separate processor boards utilize voice recognition engines, such as RECITE! by PURESPEECH, embedded in the board to process spoken messages and translate them into data values.

What is claimed is:

1. An automated phone calling system for placing outgoing phone calls, comprising:
   a first database comprising a plurality of phone numbers and one or more data fields associated with each of the plurality of phone numbers;
   means for selecting a subset of phone numbers from the plurality of phone numbers of the first database based on the selection of at least one zip code stored in a zip code data fields, wherein the at least one zip code is associated with at least one of the plurality of phone numbers;
   means for recording a voice message to be transmitted over at least one outgoing phone line;
   means for connecting to at least one outgoing phone line, the connection means operatively connected to the voice recording means;
   means for initiating at least one phone call to a callee via a callee phone number over the at least one outgoing phone line with the callee's phone number being one of the subset of phone numbers stored in the first database as selected by the selecting means;
   means for prompting the callee by playing the voice message recorded with the voice recording means, after the outgoing phone call connection has been established, to enter a new zip code;
   means for recording the new zip code entered by a callee; and
   means for automatically updating the zip code data field associated with the callee's phone number based on the entered new zip code, the updated zip code data field used by the selecting means for selecting a future subset of phone numbers.

2. The system of claim 1, further comprising a second database comprising at least one acceptable zip code.

3. The system of claim 2, further comprising a means for comparing the zip code entered by the callee with the at least one acceptable zip code of the second database to determine if the zip code entered by the callee is an acceptable zip code.

4. The system of claim 1 further comprising:
   means for creating a data file comprising the selected subset of phone numbers;
   means for recording in said data file data representing the zip code entered by the callee, and
   wherein the automatically updating means accesses the data representing the zip code recorded in said data file to thereby update the at least one data field for the callee's phone number.

5. The system of claim 1 wherein the database and the means for automatically updating reside on a computer system, the computer system having a bus, and the connection means comprises a plurality of plug-in phone cards connected to the bus of the computer system, each card having means for receiving the at least one outgoing phone line.

6. The system of claim 1, further comprising:
   means for receiving inclining phone calls, the receiving means operatively connected to the voice recording means, the means for recording, and the means for automatically updating, such that a caller placing an incoming call to the system may control further phone calls initiated by the system to the caller's phone number.

7. The system of claim 1 further comprising a geographic map including X and Y coordinate information, wherein each of the zip codes in the zip code data field are associated with X and Y coordinates corresponding to coordinates on the geographic map.

8. The system of claim 7 wherein the X and Y coordinates associated with each of the zip codes in the zip code data field are updated each time the zip code data field is updated.

9. An automated phone calling system for placing outgoing phone calls, comprising:
   a. a first database comprising a plurality of phone numbers and one or more data fields associated with each of the plurality of phone numbers;
   b. means for creating a call list of phone numbers having a specified telephone area code and exchange number;
   c. means for recording a voice message to be transmitted over at least one outgoing phone lines;
   d. means for connecting to at least one outgoing phone line, the connection means operatively connected to the voice recording means;
   e. means for initiating at least one phone call to a callee via a callee phone number over the at least one outgoing phone line with the callee's phone number being one of the phone numbers on the call list;
   f. means for prompting the callee by playing the voice message recorded with the voice recording means, after the outgoing phone call connection has been established, to enter a zip code;
   g. means for recording the zip code entered by the callee; and
   h. means for automatically updating the first database to include the callee's phone number and the callee's recorded zip code in one of the data fields associated with the callee's phone number.

10. The system of claim 9 wherein the means for creating a call list of phone numbers is operable to exclude telephone from the call list which are already stored in the first database.

11. The system of claim 9 further comprising a means for selecting a subset of phone numbers from the plurality of phone numbers in the first database based on the selection of at least one of the data fields associated with at least one of the plurality of phone numbers.

12. The system of claim 11 further comprising a second database comprising at least one acceptable zip code.

13. The system of claim 12 further comprising a means for comparing the zip code entered by the callee with the at least one acceptable zip code of the second database to determine if the zip code entered by the callee is an acceptable zip code.

14. The system of claim 9 wherein the first database and means for automatically updating reside on a computer system, the computer system having a bus, and the connection means comprises a plurality of plug-in phone cards connected to the bus of the computer system, each card having means for receiving the at least one outgoing phone line.

15. The system of claim 9 further comprising means for receiving incoming phone calls, the receiving means operatively connected to the voice recording means, the means for recording, and the means for automatically updating, such that a caller placing an incoming call to the system may control further phone calls initiated by the system to the caller's phone number.

16. A method for automatically placing outgoing phone calls, comprising the steps of:
   a. creating a call list of a plurality of phone numbers with the same telephone area code and exchange numbers;

b. for each of the plurality of phone numbers in the call list, placing an initial call to the phone numbers over at least one outgoing phone line;

c. monitoring the at least one outgoing phone line for an answer by a callee to the initial call;

d. playing a first prerecorded message upon receipt of an answer, the first prerecorded message including a prompt for the callee to enter a zip code response;

e. recording the zip code response entered by a callee; and f. automatically updating information in a first database to include the callee's phone number and zip code response.

17. The method of claim 16 further comprising, prior to the step of playing a first prerecorded message, the step of determining whether the answer by the callee to the initial call was answered.

18. The method of claim 17 further comprising the step of determining whether the call was answered by an individual or an automated machine if the call was answered.

19. The method of claim 16, wherein the system further comprises a second database comprising a plurality of acceptable zip codes, the method further comprising, prior to automatically updating information in the first database, the step of:

determining if the zip code entered by the callee is one of the acceptable zip codes in the second database.

20. The system of claim 16 further comprising the step of:

converting the entered zipcode to longitude/latitude information, and wherein the automatically updating step comprises storing the converted longitude/latitude information.

* * * * *